United States Patent
Park et al.

(10) Patent No.: US 10,772,116 B2
(45) Date of Patent: Sep. 8, 2020

(54) METHOD AND APPARATUS FOR TRANSMITTING/RECEIVING WIRELESS SIGNAL IN WIRELESS COMMUNICATION SYSTEM

(71) Applicant: LG Electronics Inc., Seoul (KR)

(72) Inventors: Hanjun Park, Seoul (KR); Suckchel Yang, Seoul (KR); Seonwook Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/656,164

(22) Filed: Oct. 17, 2019

(65) Prior Publication Data

US 2020/0120692 A1    Apr. 16, 2020

Related U.S. Application Data

(63) Continuation of application No. 16/345,845, filed on Mar. 15, 2019, now Pat. No. 10,477,567, which is a
(Continued)

(51) Int. Cl.
*H04W 72/12* (2009.01)
*H04W 72/04* (2009.01)
(Continued)

(52) U.S. Cl.
CPC ....... *H04W 72/1263* (2013.01); *H04L 1/1819* (2013.01); *H04L 5/0055* (2013.01);
(Continued)

(58) Field of Classification Search
CPC . H04W 72/1263; H04W 76/11; H04W 76/27; H04W 72/0413; H04W 72/042;
(Continued)

(56) References Cited

U.S. PATENT DOCUMENTS

2013/0034073 A1   2/2013  Aiba et al.
2013/0301600 A1  11/2013  Park
(Continued)

FOREIGN PATENT DOCUMENTS

KR   20170053610    5/2017
KR     101782758    9/2017
KR     101802761   11/2017

OTHER PUBLICATIONS

OPPO, "Summary of email discussion [90b-NR-29] on PUCCH resource set," R1-1719972, 3GPP TSG RAN WG1 Meeting 91, Reno, USA, Nov. 27-Dec. 1, 2017, 14 pages.
Motorola Mobility, Lenovo, "PUCCH resource allocation," R1-1720926, 3GPP TSG RAN WG1 #91, Reno, USA, Nov. 27-Dec. 1, 2017, 10 pages.
Qualcomm Incorporated, "Resource allocation for PUCCH," R1-1720686, 3GPP TSG RAN WG1 Meeting #91, Reno, US, Nov. 27-Dec. 1, 2017, 14 pages.
(Continued)

*Primary Examiner* — Obaidul Huq
(74) *Attorney, Agent, or Firm* — Fish & Richardson P.C.

(57) ABSTRACT

A wireless communication system is disclosed. More particularly, disclosed herein are a method including receiving downlink scheduling information on a PDCCH, the downlink scheduling information comprising resource indication information (RI), selecting a first PUCCH resource set from among a plurality of PUCCH resource sets based on a size of the control information, and transmitting the control information using a PUCCH resource corresponding to the RI in the first PUCCH resource set, wherein, when a control information size supported by the first PUCCH resource set is less than or equal to X ($>=1$) bits, the PUCCH resource is determined using one of a first scheme and a second scheme, and wherein, when the control information size supported by the first PUCCH resource set is greater than X bits, the PUCCH resource is determined using only the second scheme, and an apparatus therefor.

40 Claims, 14 Drawing Sheets

Related U.S. Application Data continuation of application No. PCT/KR2019/000541, filed on Jan. 14, 2019.

(60) Provisional application No. 62/622,732, filed on Jan. 26, 2018, provisional application No. 62/616,464, filed on Jan. 12, 2018.

(51) Int. Cl.
*H04W 76/27* (2018.01)
*H04L 1/18* (2006.01)
*H04L 5/00* (2006.01)
*H04W 76/11* (2018.01)

(52) U.S. Cl.
CPC ..... *H04W 72/042* (2013.01); *H04W 72/0413* (2013.01); *H04W 72/0446* (2013.01); *H04W 72/1289* (2013.01); *H04W 76/11* (2018.02); *H04W 76/27* (2018.02)

(58) Field of Classification Search
CPC .......... H04W 72/0446; H04W 72/1289; H04L 1/1819; H04L 5/0055
USPC ......................................... 370/310, 328, 329
See application file for complete search history.

(56) References Cited

U.S. PATENT DOCUMENTS

| | | |
|---|---|---|
| 2015/0043394 A1 | 2/2015 | Lin et al. |
| 2018/0054280 A1 | 2/2018 | Fu et al. |
| 2018/0145796 A1* | 5/2018 | Liang .................... H04L 1/1861 |
| 2018/0176902 A1* | 6/2018 | Huang .................. H04L 5/0094 |
| 2019/0124647 A1 | 4/2019 | Li |
| 2019/0140804 A1* | 5/2019 | Tang ..................... H04L 1/1854 |

OTHER PUBLICATIONS

OPPO, "Resource allocation for PUCCH," R1-1719971, 3GPP TSG RAN WG1 Meeting 91, Reno, USA, Nov. 27-Dec. 1, 2017, 9 pages.

LG Electronics, "Considerations on PUCCH resource allocation for NR," R1-1717963, 3GPP TSG RAN WG1 Meeting 90bis, Prague, CZ, Oct. 9-13, 2017, 10 pages.

OPPO, "Summary of offline discussion on PUCCH resource allocation," R1-1721559, 3GPP TSG RAN WG1 Meeting 91, Reno, USA, Nov. 27-Dec. 1, 2017 11 pages.

Korean Notice of Allowance in Korean Application No. 10-2020-7001429, dated Feb. 4, 2020, 4 pages (with English translation).

OPPO, "Summary of offline discussions for PUCCH resource allocation until Oct. 11," R1-1719015, 3GPP TSG RAN WG1 Meeting 90bis, Prague, CZ, dated Oct. 9-13, 2017, 10 pages.

\* cited by examiner

METHOD AND APPARATUS FOR TRANSMITTING/RECEIVING WIRELESS SIGNAL IN WIRELESS COMMUNICATION SYSTEM

CROSS-REFERENCE TO RELATED APPLICATIONS

This application is a continuation of U.S. application Ser. No. 16/354,845, filed on Mar. 15, 2019, now allowed, which is a continuation of International Application No. PCT/KR2019/000541, filed on Jan. 14, 2019, which claims the benefit of U.S. Provisional Application No. 62/622,732, filed on Jan. 26, 2018, and U.S. Provisional Application No. 62/616,464, filed on Jan. 12, 2018. The disclosures of the prior applications are incorporated by reference in their entirety.

TECHNICAL FIELD

The present invention relates to a wireless communication system, and more particularly, to a method and apparatus for transmitting/receiving a wireless signal.

BACKGROUND ART

Generally, a wireless communication system is developing to diversely cover a wide range to provide such a communication service as an audio communication service, a data communication service and the like. The wireless communication is a sort of a multiple access system capable of supporting communications with multiple users by sharing available system resources (e.g., bandwidth, transmit power, etc.). For example, the multiple access system may include one of CDMA (code division multiple access) system, FDMA (frequency division multiple access) system, TDMA (time division multiple access) system, OFDMA (orthogonal frequency division multiple access) system, SC-FDMA (single carrier frequency division multiple access) system and the like.

DISCLOSURE

Technical Problem

An object of the present invention is to provide a method of efficiently transmitting/receiving control information in a wireless communication and an apparatus therefor.

Technical tasks obtainable from the present invention are non-limited the above-mentioned technical task. And, other unmentioned technical tasks can be clearly understood from the following description by those having ordinary skill in the technical field to which the present invention pertains.

Technical Solution

In one aspect of the present invention, provided herein is a method for transmitting, by a communication device, control information in a wireless communication system, the method including receiving downlink scheduling information through a physical downlink control channel (PDCCH), the downlink scheduling information including resource indication information (RI), selecting a first physical uplink control channel (PUCCH) resource set from among a plurality of PUCCH resource sets based on a size of the control information, and transmitting the control information using a PUCCH resource corresponding to the RI in the first PUCCH resource set, wherein, when a control information size supported by the first PUCCH resource set is less than or equal to X ($>=1$) bits, the PUCCH resource is determined using one of a first scheme and a second scheme, and wherein, when the control information size supported by the first PUCCH resource set is greater than X bits, the PUCCH resource is determined using only the second scheme:

the first scheme: a pair of (the RI, an index of a resource used for reception of the PDCCH) one-to-one corresponds to the PUCCH resource in the first PUCCH resource set; and the second scheme: the RI one-to-one corresponds to the PUCCH resource in the first PUCCH resource set.

In another aspect of the present invention, provided herein is a communication apparatus used in a wireless communication system, including a memory, and a processor, the processor being configured to receive downlink scheduling information through a physical downlink control channel (PDCCH), the downlink scheduling information including resource indication information (RI), select a first physical uplink control channel (PUCCH) resource set from among a plurality of PUCCH resource sets based on a size of the control information, and transmit the control information using a PUCCH resource corresponding to the RI in the first PUCCH resource set, wherein, when a control information size supported by the first PUCCH resource set is less than or equal to X ($>=1$) bits, the PUCCH resource is determined using one of a first scheme and a second scheme, and wherein, when the control information size supported by the first PUCCH resource set is greater than X bits, the PUCCH resource is determined using only the second scheme:

the first scheme: a pair of (the RI, an index of a resource used for reception of the PDCCH) one-to-one corresponds to the PUCCH resource in the first PUCCH resource set; and the second scheme: the RI one-to-one corresponds to the PUCCH resource in the first PUCCH resource set.

In another aspect of the present invention, provided herein is a method for receiving, by a communication apparatus, control information in a wireless communication system, the method including transmitting downlink scheduling information through a physical downlink control channel (PDCCH), the downlink scheduling information including resource indication information (RI), selecting a first physical uplink control channel (PUCCH) resource set from among a plurality of PUCCH resource sets based on a size of the control information, and receiving the control information using a PUCCH resource corresponding to the RI in the first PUCCH resource set, wherein, when a control information size supported by the first PUCCH resource set is less than or equal to X ($>=1$) bits, the PUCCH resource is determined using one of a first scheme and a second scheme, and wherein, when the control information size supported by the first PUCCH resource set is greater than X bits, the PUCCH resource is determined using only the second scheme:

the first scheme: a pair of (the RI, an index of a resource used for reception of the PDCCH) one-to-one corresponds to the PUCCH resource in the first PUCCH resource set; and the second scheme: the RI one-to-one corresponds to the PUCCH resource in the first PUCCH resource set.

In another aspect of the present invention, provided herein is a communication apparatus used in a wireless communication system, including a memory, and a processor, the processor being configured to transmit downlink scheduling information through a physical downlink control channel (PDCCH), the downlink scheduling information including resource indication information (RI), select a first physical uplink control channel (PUCCH) resource set from among a plurality of PUCCH resource sets based on a size of the control information, and receive the control information using a PUCCH resource corresponding to the RI in the first PUCCH resource set, wherein, when a control information size supported by the first PUCCH resource set is less than or equal to X (>=1) bits, the PUCCH resource is determined using one of a first scheme and a second scheme, and wherein, when the control information size supported by the first PUCCH resource set is greater than X bits, the PUCCH resource is determined using only the second scheme:

the first scheme: a pair of (the RI, an index of a resource used for reception of the PDCCH) one-to-one corresponds to the PUCCH resource in the first PUCCH resource set; and the second scheme: the RI one-to-one corresponds to the PUCCH resource in the first PUCCH resource set.

X may be 2.

When the information size supported by the first PUCCH resource set is less than or equal to X (>=1) bits, the first scheme or the second scheme may be used based on the number of PUCCH resources in the first PUCCH resource set.

When the information size supported by the first PUCCH resource set is less than or equal to X (>=1) bits and the number of PUCCH resources in the first PUCCH resource set is greater than a reference value, the PUCCH resource may be determined using the first scheme, wherein the reference value may be equal to the number of values representable by the RI.

When the information size supported by the first PUCCH resource set is less than or equal to X (>=1) bits and the number of PUCCH resources in the first PUCCH resource set is less than or equal to a reference value, the PUCCH resource may be determined using the second scheme, wherein the reference value may be equal to the number of values representable by the RI.

Advantageous Effects

According to the present invention, wireless signal transmission and reception can be efficiently performed in a wireless communication system.

Effects obtainable from the present invention may be non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

BEST MODE

Embodiments of the present invention are applicable to a variety of wireless access technologies such as code division multiple access (CDMA), frequency division multiple access (FDMA), time division multiple access (TDMA), orthogonal frequency division multiple access (OFDMA), and single carrier frequency division multiple access (SC-FDMA). CDMA can be implemented as a radio technology such as Universal Terrestrial Radio Access (UTRA) or CDMA2000. TDMA can be implemented as a radio technology such as Global System for Mobile communications (GSM)/General Packet Radio Service (GPRS)/Enhanced Data Rates for GSM Evolution (EDGE). OFDMA can be implemented as a radio technology such as Institute of Electrical and Electronics Engineers (IEEE) 802.11 (Wireless Fidelity (Wi-Fi)), IEEE 802.16 (Worldwide interoperability for Microwave Access (WiMAX)), IEEE 802.20, and Evolved UTRA (E-UTRA). UTRA is a part of Universal Mobile Telecommunications System (UMTS). 3rd Generation Partnership Project (3GPP) Long Term Evolution (LTE) is part of Evolved UMTS (E-UMTS) using E-UTRA, and LTE-Advanced (A) is an evolved version of 3GPP LTE. 3GPP NR (New Radio or New Radio Access Technology) is an evolved version of 3GPP LTE/LTE-A.

As more and more communication devices require a larger communication capacity, there is a need for mobile broadband communication enhanced over conventional radio access technology (RAT). In addition, massive Machine Type Communications (MTC) capable of providing a variety of services anywhere and anytime by connecting multiple devices and objects is another important issue to be considered for next generation communications. Communication system design considering services/UEs sensitive to reliability and latency is also under discussion. As such, introduction of new radio access technology considering enhanced mobile broadband communication (eMBB), massive MTC, and Ultra-Reliable and Low Latency Communication (URLLC) is being discussed. In the present invention, for simplicity, this technology will be referred to as NR (New Radio or New RAT).

For the sake of clarity, 3GPP NR is mainly described, but the technical idea of the present invention is not limited thereto.

In a wireless communication system, a user equipment (UE) receives information through downlink (DL) from a base station (BS) and transmit information to the BS through uplink (UL). The information transmitted and received by the BS and the UE includes data and various control information and includes various physical channels according to type/usage of the information transmitted and received by the UE and the BS.

Figure 1:
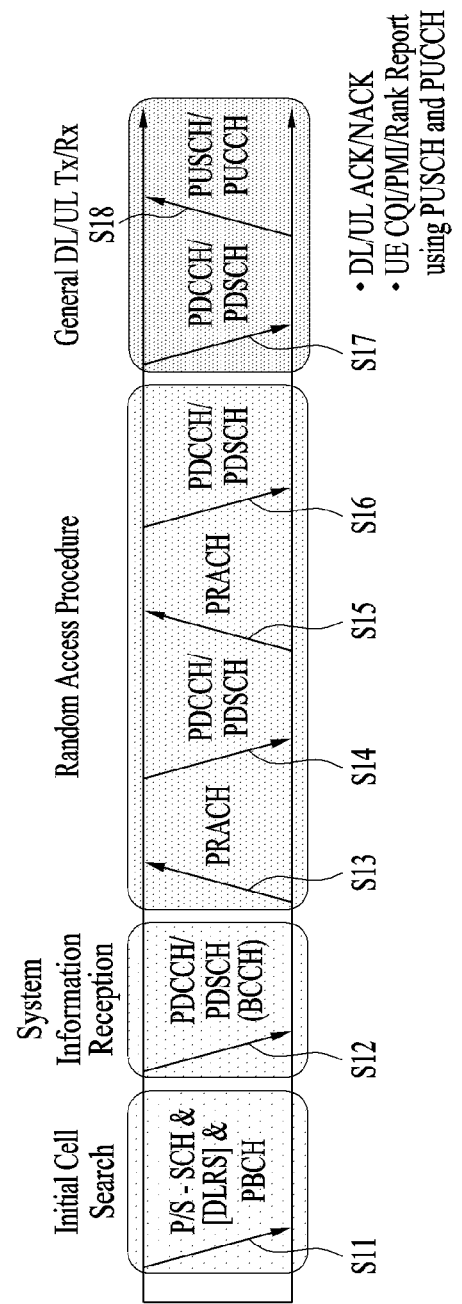
FIG. 1 illustrates physical channels used in a 3GPP system, which is an example of wireless communication systems, and a general signal transmission method using the same.

FIG. 1 illustrates physical channels used in a 3GPP NR system and a general signal transmission method using the same.

When powered on or when a UE initially enters a cell, the UE performs initial cell search involving synchronization with a BS in step S101. For initial cell search, the UE synchronizes with the BS and acquires information such as a cell Identifier (ID) by receiving a primary synchronization channel (P-SCH) and a secondary synchronization channel (S-SCH) from the BS. Then the UE may receive broadcast information from the cell on a physical broadcast channel (PBCH). In the meantime, the UE may check a downlink channel status by receiving a downlink reference signal (DL RS) during initial cell search.

After initial cell search, the UE may acquire more specific system information by receiving a physical downlink control channel (PDCCH) and receiving a physical downlink shared channel (PDSCH) based on information of the PDCCH in step S102.

The UE may perform a random access procedure to access the BS in steps S103 to S106. For random access, the UE may transmit a preamble to the BS on a physical random access channel (PRACH) (S103) and receive a response message for preamble on a PDCCH and a PDSCH corresponding to the PDCCH (S104). In the case of contention-based random access, the UE may perform a contention resolution procedure by further transmitting the PRACH (S105) and receiving a PDCCH and a PDSCH corresponding to the PDCCH (S106).

After the foregoing procedure, the UE may receive a PDCCH/PDSCH (S107) and transmit a physical uplink shared channel (PUSCH)/physical uplink control channel (PUCCH) (S108), as a general downlink/uplink signal transmission procedure. Control information transmitted from the UE to the BS is referred to as uplink control information (UCI). The UCI includes hybrid automatic repeat and request acknowledgement/negative-acknowledgement (HARQ-ACK/NACK), scheduling request (SR), channel state information (CSI), etc. The CSI includes a channel quality indicator (CQI), a precoding matrix indicator (PMI), a rank indicator (RI), etc. While the UCI is transmitted on a PUCCH in general, the UCI may be transmitted on a PUSCH when control information and traffic data need to be simultaneously transmitted. In addition, the UCI may be aperiodically transmitted through a PUSCH according to request/command of a network.

Figure 2:
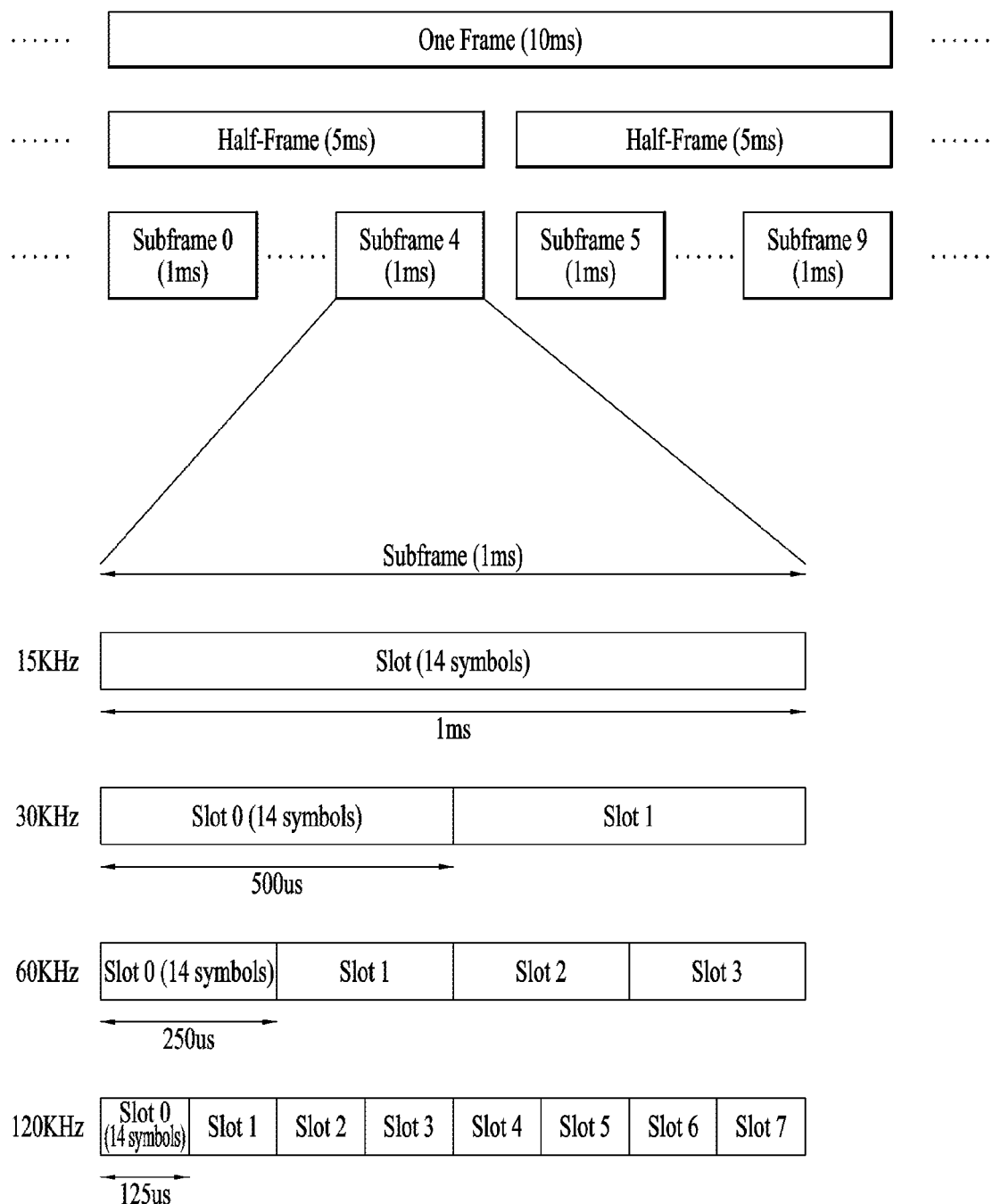
FIG. 2 illustrates a radio frame structure.

FIG. 2 illustrates a radio frame structure. In NR, uplink and downlink transmissions are configured with frames. Each radio frame has a length of 10 ms and is divided into two 5-ms half-frames (HF). Each half-frame is divided into five 1-ms subframes (SFs). A subframe is divided into one or more slots, and the number of slots in a subframe depends on subcarrier spacing (SCS). Each slot includes 12 or 14 Orthogonal Frequency Division Multiplexing (OFDM) symbols according to a cyclic prefix (CP). When a normal CP is used, each slot includes 14 OFDM symbols. When an extended CP is used, each slot includes 12 OFDM symbols.

Table 1 exemplarily shows that the number of symbols per slot, the number of slots per frame, and the number of slots per subframe vary according to the SCS when the normal CP is used.

TABLE 1

| SCS ($15 * 2^u$) | $N^{slot}_{symb}$ | $N^{frame,u}_{slot}$ | $N^{subframe,u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

$N^{slot}_{symb}$: Number of symbols in a slot
$N^{frame,u}_{slot}$: Number of slots in a frame
$N^{subframe,u}_{slot}$: Number of slots in a subframe Table 2 illustrates that the number of symbols per slot, the number of slots per frame, and the number of slots per subframe vary according to the SCS when the extended CP is used.

TABLE 2

| SCS ($15 * 2^u$) | $N^{slot}_{symb}$ | $N^{frame,u}_{slot}$ | $N^{subframe,u}_{slot}$ |
|---|---|---|---|
| 60 KHz (u = 2) | 12 | 40 | 4 |

The structure of the frame is merely an example. The number of subframes, the number of slots, and the number of symbols in a frame may vary.

In the NR system, OFDM numerology (e.g., SCS) may be configured differently for a plurality of cells aggregated for one UE. Accordingly, the (absolute time) duration of a time resource (e.g., an SF, a slot or a TTI) (for simplicity, referred to as a time unit (TU)) consisting of the same number of symbols may be configured differently among the aggregated cells. Here, the symbols may include an OFDM symbol (or a CP-OFDM symbol) and an SC-FDMA symbol (or a Discrete Fourier Transform-spread-OFDM (DFT-s-OFDM) symbol).

Figure 3:
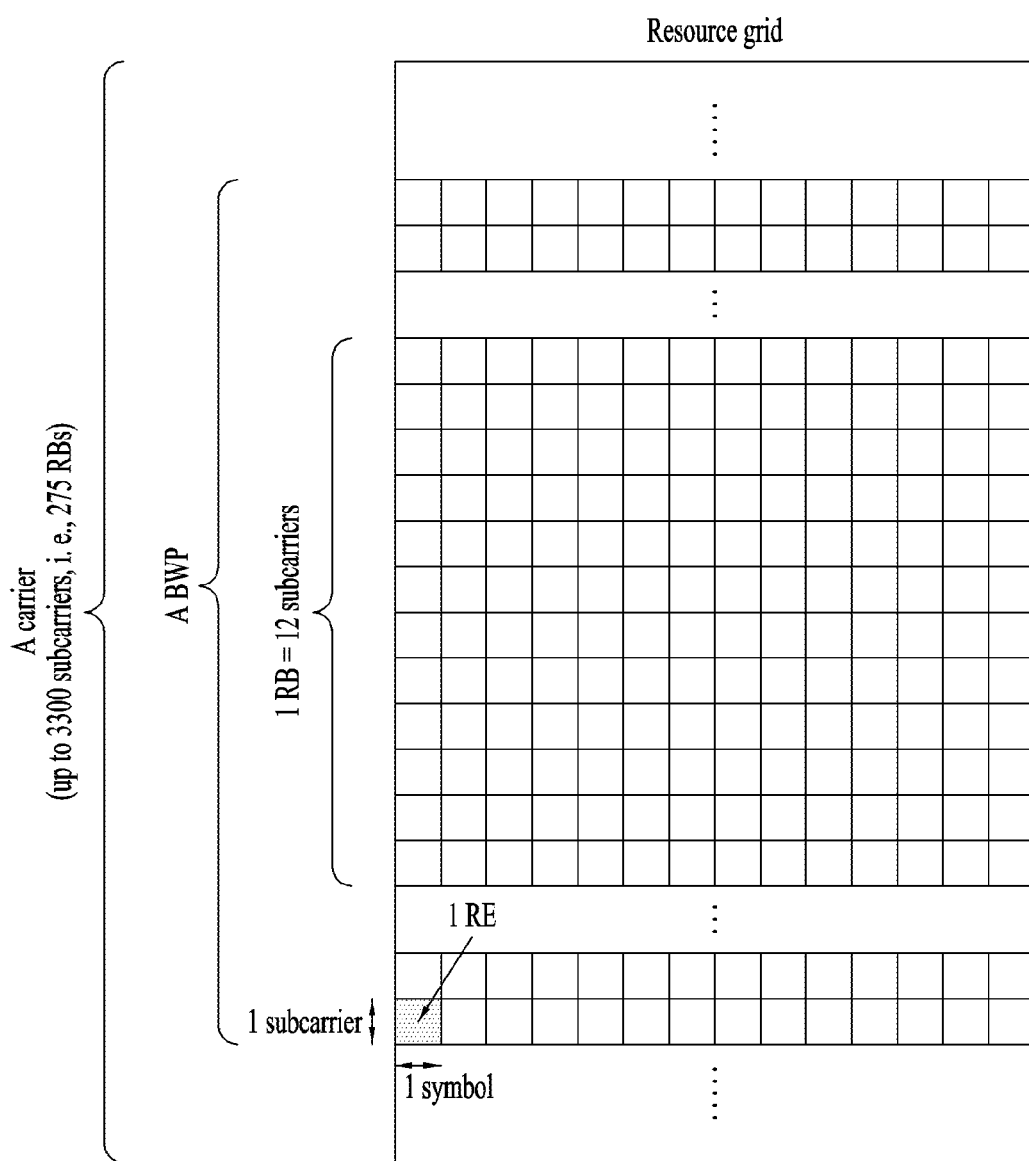
FIG. 3 illustrates a resource grid of a slot.

FIG. 3 illustrates a resource grid of a slot. A slot includes a plurality of symbols in the time domain. For example, when the normal CP is used, the slot includes 14 symbols. However, when the extended CP is used, the slot includes 12 symbols. A carrier includes a plurality of subcarriers in the frequency domain. A resource block (RB) is defined as a plurality of consecutive subcarriers (e.g., 12 consecutive subcarriers) in the frequency domain. A bandwidth part (BWP) may be defined to be a plurality of consecutive physical RBs (PRBs) in the frequency domain and correspond to a single numerology (e.g., SCS, CP length, etc.). The carrier may include up to N (e.g., 5) BWPs. Data communication may be performed through an activated BWP, and only one BWP may be activated for one UE. In the resource grid, each element is referred to as a resource element (RE), and one complex symbol may be mapped to each RE.

Figure 4:
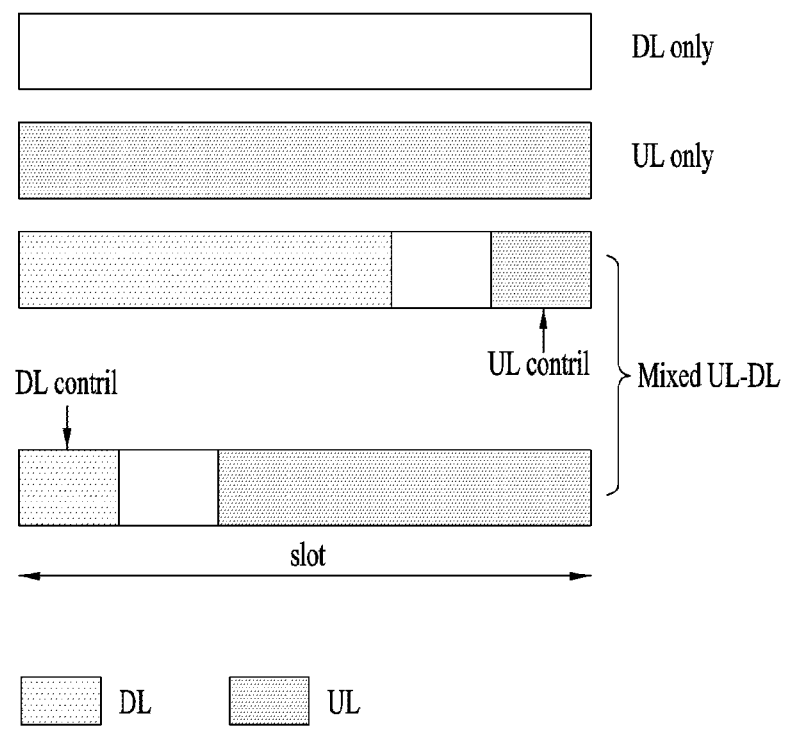
FIG. 4 illustrates a structure of a self-contained slot.

FIG. 4 illustrates a structure of a self-contained slot. In the NR system, a frame has a self-contained structure in which a DL control channel, DL or UL data, a UL control channel, and the like may all be included in one slot. For example, the first N symbols (hereinafter referred to as a DL control region) in a slot may be used to transmit a DL control channel, and the last M symbols (hereinafter referred to as a UL control region) in the slot may be used to transmit a UL control channel. N and M are integers greater than 0. A resource region between the DL control region and the UL control region (hereinafter referred to as a data region) may be used for DL data transmission or UL data transmission. There may be a time gap for DL-to-UL or UL-to-DL switching between the control region and the data region. For example, the following configurations may be considered. Corresponding intervals are listed in temporal order.

1. DL only configuration
2. UL only configuration
3. Mixed UL-DL configuration
   DL region+Guard Period (GP)+UL control region;
   DL control region+GP+UL region,
   DL region: (i) DL data region or (ii) DL control region+ DL data region;
   UL region: (i) UL data region or (ii) UL data region+UL control region.

Figure 5:
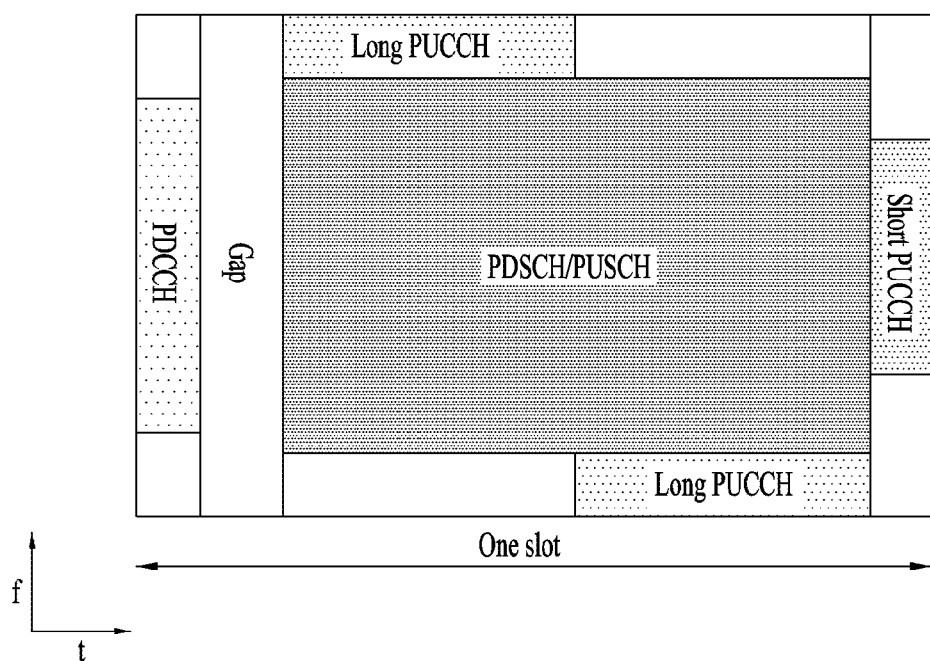
FIG. 5 illustrates an example in which a physical channel is mapped into a self-contained slot.

FIG. 5 illustrates an example in which a physical channel is mapped into a self-contained slot. A PDCCH may be transmitted in the DL control region, and a PDSCH may be transmitted in the DL data region. A PUCCH may be transmitted in the UL control region, and a PUSCH may be transmitted in the UL data region. The GP provides a time gap in the process of switching from the transmission mode to the reception mode or from the reception mode to the transmission mode. Some symbols at the time of switching from DL to UL within a subframe may be configured as the GP.

Hereinafter, each of the physical channels will be described in more detail.

The PDCCH carries Downlink Control Information (DCI). For example, the PCCCH (i.e., DCI) carries a transmission format and resource allocation of a downlink shared channel (DL-SCH), resource allocation information about an uplink shared channel (UL-SCH), paging information about a paging channel (PCH), system information present on the DL-SCH, resource allocation information about a higher layer control message such as a random access response transmitted on a PDSCH, a transmit power control command, and activation/release of configured scheduling (CS). The DCI includes a cyclic redundancy check (CRC). The CRC is masked/scrambled with different identifiers (e.g., Radio Network Temporary Identifier (RNTI)) according to the owner or usage of the PDCCH. For example, if the PDCCH is for a specific UE, the CRC will be masked with a UE identifier (e.g., Cell-RNTI (C-RNTI)). If the PDCCH is for paging, the CRC will be masked with a Paging-RNTI (P-RNTI). If the PDCCH is for system information (e.g., a system information block (SIB)), the CRC will be masked with an system information RNTI (SI-RNTI). If the PDCCH is for a random access response, the CRC will be masked with a random access-RNTI (RA-RNTI).

The PDCCH consists of 1, 2, 4, 8, or 16 Control Channel Elements (CCEs) depending on an aggregation level (AL). The CCE is a logical allocation unit used to provide a PDCCH having a predetermined code rate according to a radio channel state. A CCE consists of 6 Resource Element Groups (REGs). An REG is defined by one OFDM symbol and one (P)RB. The PDCCH is transmitted through a Control Resource Set (CORESET). The CORESET is defined as an REG set having a given numerology (e.g., SCS, CP length). A plurality of CORESETs for one UE may overlap with each other in the time/frequency domain. A CORESET may be configured through system information (e.g., a Master Information Block (MIB)) or UE-specific higher layer (e.g. Radio Resource Control (RRC) layer) signaling. Specifically, the number of RBs and the number of OFDM symbols (a maximum of 3 OFDM symbols) that constitute the CORESET may be configured by higher layer signaling.

To receive/detect a PDCCH, the UE monitors PDCCH candidates. The PDCCH candidates represent the CCE(s) that the UE should monitor for PDCCH detection. Each PDCCH candidate is defined as 1, 2, 4, 8, or 16 CCEs depending on the AL. The monitoring includes (blind) decoding of the PDCCH candidates. A set of PDCCH candidates monitored by the UE is defined as a PDCCH Search Space (SS). The SS includes a common search space (CSS) or a UE-specific search space (USS). The UE may acquire DCI by monitoring the PDCCH candidates in one or more SSs configured by the MIB or higher layer signaling. Each CORESET is associated with one or more SSs, and each of the SSs is associated with one COREST. The SSs may be defined based on the following parameters.

controlResourceSetId: Indicates a CORESET associated with an SS;
monitoringSlotPeriodicityAndOffset: Indicates a PDCCH monitoring periodicity (in units of slots) and a PDCCH monitoring interval offset (in units of slots);
monitoringSymbolsWithinSlot: Indicates PDCCH monitoring symbols in a slot (e.g. the first symbol(s) of the CORESET);
nrofCandidates: Indicates the number of PDCCH candidates (one of 0, 1, 2, 3, 4, 5, 6, and 8) for each AL={1, 2, 4, 8, 16}.

An occasion (e.g., time/frequency resources) in which PDCCH candidates should be monitored is defined as a PDCCH (monitoring) occasion. One or more PDCCH (monitoring) occasions may be configured in a slot.

Table 3 exemplarily shows the features of the respective search space types.

TABLE 3

| Type | Search Space | RNTI | Use Case |
| --- | --- | --- | --- |
| Type0-PDCCH | Common | SI-RNTI on a primary cell | SIB Decoding |
| Type0A-PDCCH | Common | SI-RNTI on a primary cell | SIB Decoding |
| Type1-PDCCH | Common | RA-RNTI or TC-RNTI on a primary cell | Msg2, Msg4 decoding in RACH |
| Type2-PDCCH | Common | P-RNTI on a primary cell | Paging Decoding |
| Type3-PDCCH | Common | INT-RNTI, SFI-RNTI, TPC-PUSCH- RNTI, TPC-PUCCH-RNTI, TPC-SRS-RNTI, C-RNTI, MCS-C-RNTI, or CS-RNTI(s) | |
| | UE Specific | C-RNTI, or MCS-C-RNTI, or CS-RNTI(s) | User specific PDSCH decoding |

Table 4 exemplarily shows DCI formats transmitted on the PDCCH.

TABLE 4

| DCI format | Usage |
| --- | --- |
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |

DCI format 0_0 may be used for scheduling of a TB-based (or TB-level) PUSCH, and DCI format 0_1 may be used for scheduling of a TB-based (or TB-level) PUSCH or a Code Block Group (CBG)-based (or CBG-level) PUSCH. DCI format 1_0 may be used for scheduling of a TB-based (or TB-level) PDSCH, and DCI format 1_1 may be used for scheduling of a TB-based (or TB-level) PDSCH or a CBG-based (or CBG-level) PDSCH (DL grant DCI). DCI format 0_0/0_1 may be referred to as UL grant DCI or UL scheduling information, and DCI format 1_0/1_1 may be referred to as DL grant DCI or UL scheduling information. DCI format 2_0 is used to deliver dynamic slot format information (e.g., dynamic SFI) to the UE, and DCI format 2_1 is used to deliver downlink pre-emption information to the UE.

DCI format 2_0 and/or DCI format 2_1 may be delivered to UEs in a group on a group common PDCCH, which is a PDCCH delivered to UEs defined as one group.

DCI format 0_0 and DCI format 1_0 may be referred to as fallback DCI formats, and DCI format 0_1 and DCI format 1_1 may be referred to as non-fallback DCI formats. For the fallback DCI formats, the same DCI size/field configuration is maintained regardless of the UE configuration. On the other hand, for the non-fallback DCI formats, the DCI size/field configuration varies according to the UE configuration.

The PDSCH carries downlink data (e.g., DL-SCH transport block (DL-SCH TB)), and a modulation technique such as Quadrature Phase Shift Keying (QPSK), 16 Quadrature Amplitude Modulation (QAM), 64 QAM, or 256 QAM is applied thereto. The TB is encoded to generate a codeword. The PDSCH may carry a maximum of two codewords. Scrambling and modulation mapping may be performed on each codeword, and the modulation symbols generated from each codeword may be mapped to one or more layers. Each of the layers is mapped to a resource together with a Demodulation Reference Signal (DMRS) to generate an OFDM symbol signal and transmit the signal through a corresponding antenna port.

The PUCCH carries Uplink Control Information (UCI). The UCI includes the following information.

Scheduling Request (SR): Information that is used to request a UL-SCH resource.

Hybrid Automatic Repeat Request (HARQ)-Acknowledgment (ACK): A response to a downlink data packet (e.g., codeword) on the PDSCH. HARQ-ACK indicates whether the downlink data packet has been successfully received. In response to a single codeword, one bit of HARQ-ACK may be transmitted. In response to two codewords, two bits of HARQ-ACK may be transmitted. The HARQ-ACK response includes positive ACK (simply, ACK), negative ACK (NACK), DTX or NACK/DTX. Here, the HARQ-ACK is used interchangeably used with HARQ ACK/NACK and ACK/NACK.

Channel State Information (CSI): Feedback information about a downlink channel. Multiple Input Multiple Output (MIMO)-related feedback information includes a Rank Indicator (RI) and a Precoding Matrix Indicator (PMI).

Table 5 exemplarily shows PUCCH formats. PUCCH formats may be divided into Short PUCCHs (Formats 0 and 2) and Long PUCCHs (Formats 1, 3, and 4) based on the PUCCH transmission duration.

TABLE 5

| PUCCH format | Length in OFDM symbols $N^{PUCCH}_{symb}$ | Number of bits | Usage | Etc |
|---|---|---|---|---|
| 0 | 1-2 | ≤2 | HARQ, SR | Sequence selection |
| 1 | 4-14 | ≤2 | HARQ, [SR] | Sequence modulation |
| 2 | 1-2 | >2 | HARQ, CSI, [SR] | CP-OFDM |
| 3 | 4-14 | >2 | HARQ, CSI, [SR] | DFT-s-OFDM(no UE multiplexing) |
| 4 | 4-14 | >2 | HARQ, CSI, [SR] | DFT-s-OFDM(Pre DFT OCC) |

PUCCH format 0 carries UCI having a size of up to 2 bits, and is mapped based on a sequence and transmitted. Specifically, a UE transmits one of a plurality of sequences on a PUCCH corresponding to PUCCH format 0 to transmit specific UCI to the eNB. Only when transmitting a positive SR, the UE transmits a PUCCH corresponding to PUCCH format 0 within a PUCCH resource for the corresponding SR configuration.

PUCCH format 1 carries UCI having a size of up to 2 bits, and the modulation symbols therefor are spread by an orthogonal cover code (OCC) (configured differently depending on whether frequency hopping is performed) in the time domain. The DMRS is transmitted on a symbol on which a modulation symbol is not transmitted (namely, the DMRS is transmitted through time division multiplexing (TDM)).

PUCCH format 2 carries UCI having a bit size larger than 2 bits, and the modulation symbols are transmitted through frequency division multiplexing (FDM) with the DMRS. The DM-RS is positioned on symbol indexes #1, #4, #7 and #10 in a resource block given with a density of ⅓. A Pseudo Noise (PN) sequence is used for the DM_RS sequence. For two-symbol PUCCH format 2, frequency hopping may be enabled.

PUCCH format 3 is not subjected to UE multiplexing in the same physical resource block, but carries UCI having a bit size larger than 2 bits. In other words, the PUCCH resource of PUCCH format 3 does not include an OCC. The modulation symbols are transmitted through time division multiplexing (TDM) with the DMRS.

PUCCH format 4 supports multiplexing with up to 4 UEs in the same physical resource blocks and carries UCI having a bit size larger than 2 bits. In other words, the PUCCH resource of PUCCH format 3 includes an OCC. The modulation symbols are transmitted through time division multiplexing (TDM) with the DMRS.

The PUSCH carries uplink data (e.g., UL-SCH transport block (UL-SCH TB)) and/or uplink control information (UCI), and is transmitted based on a Cyclic Prefix-Orthogonal Frequency Division Multiplexing (CP-OFDM) waveform or a Discrete Fourier Transform-spread-Orthogonal Frequency Division Multiplexing (DFT-s-OFDM) waveform. When the PUSCH is transmitted based on the DFT-s-OFDM waveform, the UE applies transform precoding to transmit the PUSCH. For example, when the transform precoding is not allowed (e.g., the transform precoding is disabled), the UE may transmit the PUSCH based on the CP-OFDM waveform. When the transform precoding is allowed (e.g., the transform precoding is enabled), the UE may transmit the PUSCH based on the CD-OFDM waveform or the DFT-s-OFDM waveform. PUSCH transmission may be dynamically scheduled by the UL grant in the DCI or semi-statically scheduled based on higher layer (e.g., RRC) signaling (and/or Layer 1 (L1) signaling (e.g., PDCCH)) (configured grant). The PUSCH transmission may be performed on a codebook basis or on a non-codebook basis.

Figure 6:
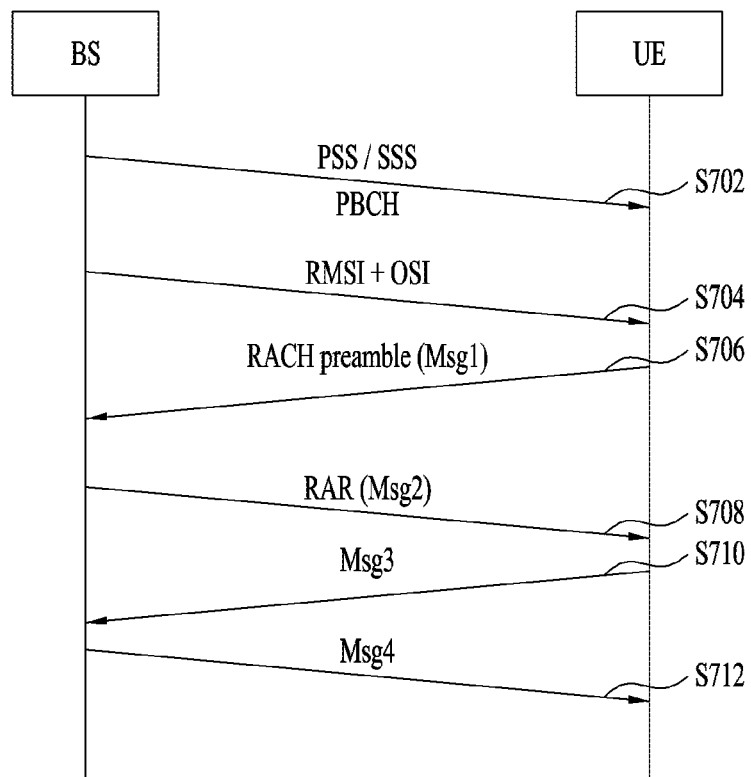
FIG. 6 illustrates a beam-based initial access procedure.

FIG. 6 illustrates a beam-based initial access procedure. In 3GPP NR, a physical channel or a reference signal may be transmitted using beamforming. In this case, the beams should be aligned/managed between the eNB and the UE in order to perform signal transmission/reception. In the Radio Resource Control (RRC) IDLE mode, beam alignment may be performed based on the SSB. In the RRC CONNECTED mode, on the other hand, beam alignment may be performed based on the CSI-RS (in DL) and the SRS (in UL).

Referring to FIG. 6, an eNB (e.g., a BS) may periodically transmit an SSB (S702). Here, the SSB includes PSS/SSS/PBCH. The SSB may be transmitted using beam sweeping (see FIG. 6). Thereafter, the eNB may transmit Remaining Minimum System Information (RMSI) and Other System Information (OSI) (S704). The RMSI may include information (e.g., PRACH configuration information) necessary for the UE to initially access the eNB. The UE performs SSB detection and then identifies the best SSB. Then, the UE may transmit an RACH preamble (Message 1 (Msg1)) to the eNB using the PRACH resource that is linked/correspond to the index (i.e., beam) of the best SSB (S706). The beam direction of the RACH preamble is associated with the PRACH resource. The association between the PRACH resource (and/or the RACH preamble) and the SSB (index) may be established through system information (e.g., RMSI). Then, as a part of the RACH procedure, the eNB transmits a Random Access Response (RAR) (Msg2) in response to the RACH preamble (S708). Specifically, the scheduling information about the RAR message may be CRC-masked with a Random Access-RNTI (RA-RNTI) and transmitted on the L1/L2 control channel (PDCCH). The PDCCH masked with RA-RNTI may only be transmitted through the common search space. Once the UE receives a scheduling signal masked with the RA-RNTI, the UE may receive the RAR message on the PDSCH indicated by the scheduling information. Thereafter, the UE checks whether there is random access response information indicated to the UE in the RAR message. Whether there is random access response information indicated to the UE may be checked by checking whether there is a Random Access Preamble ID (RAID) for the preamble transmitted by the UE. The random access response information includes timing offset information (e.g., Timing Advance Command (TAC)) for UL synchronization, UL scheduling information (e.g., UL grant), and UE temporary identification information (e.g., Temporary-C-RNTI (TC-RNTI)). Upon receiving the random access response information, the UE may transmit Msg3 (e.g., RRC Connection Request) on the PUCCH using the UL grant in the RAR (S710). Msg3 may include a UE identity for contention resolution. Thereafter, the eNB may transmit a contention resolution message Msg4 (S720). Msg4 may include RRC Connection Setup.

Figure 7:
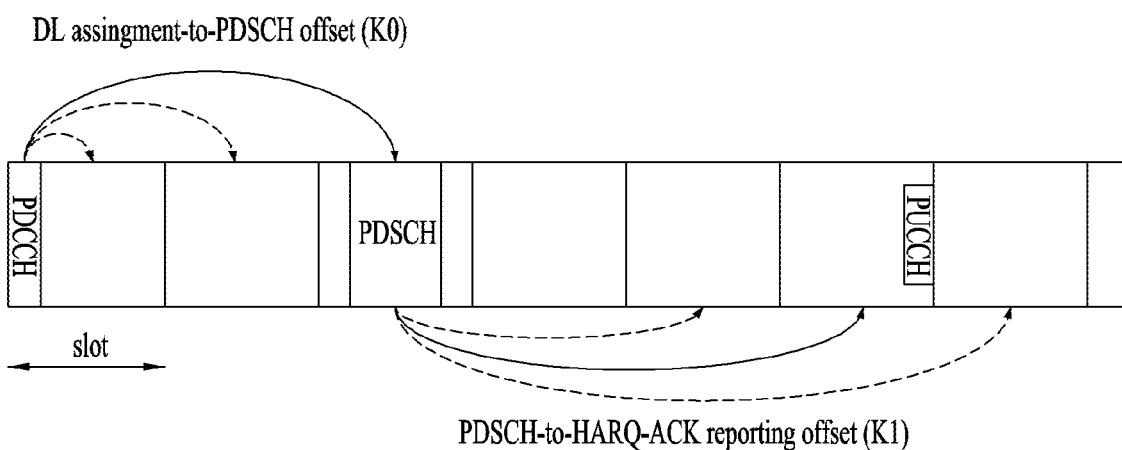
FIG. 7 illustrates an ACK/NACK transmission procedure.

FIG. 7 illustrates an ACK/NACK transmission procedure. Referring to FIG. 7, the UE may detect a PDCCH in slot # n. Here, the PDCCH includes downlink scheduling information (e.g., DCI format 1_0 or 1_1). The PDCCH indicates a DL assignment-to-PDSCH offset (K0) and a PDSCH-HARQ-ACK reporting offset (K1). For example, DCI format 1_0 or 1_1 may include the following information.

Frequency domain resource assignment: Indicates an RB set assigned to the PDSCH.

Time domain resource assignment: Indicates K0 and the starting position (e.g. OFDM symbol index) and duration (e.g. the number of OFDM symbols) of the PDSCH in a slot.

PDSCH-to-HARQ feedback timing indicator: Indicates K1.

After receiving the PDSCH in slot #(n+K0) according to the scheduling information of slot # n, the UE may transmit UCI on the PUCCH in slot #(n+K1). Here, the UCI includes a HARQ-ACK response to the PDSCH. In the case where the PDSCH is configured to transmit a maximum of one TB, the HARQ-ACK response may be configured in one bit. In the case where the PDSCH is configured to transmit a maximum of two TBs, the HARQ-ACK response may be configured in two bits if spatial bundling is not configured and may be configured in one bit if spatial bundling is configured. When slot #(n+K1) is designated as a HARQ-ACK transmission time for a plurality of PDSCHs, the UCI transmitted in slot #(n+K1) includes a HARQ-ACK response to the plurality of PDSCHs.

Embodiment: PUCCH Resource Allocation

In the NR system, UCI is transmitted on the PUCCH. The UCI includes HARQ-ACK, SR, and CSI. As an example of allocating PUCCH resources, the eNB may configure a plurality of PUCCH resource sets for the UE, and the UE may select a specific PUCCH resource set corresponding to a specific range according to a range of the UCI (payload) size (e.g., the number of UCI bits). For example, the UE may select one of the following PUCCH resource sets according to the number of UCI bits $N_{UCI}$:

PUCCH resource set #0, if $N_{UCI} \leq 2$;
PUCCH resource set #1, if $2 < N_{UCI} \leq N_1$;
. . . ;
PUCCH resource set #(K-1), if $N_{K-2} < N_{UCI} \leq N_{K-1}$.

Here, K denotes the number of PUCCH resource sets (K>1), and $N_i$ is the maximum number of UCI bits supported by PUCCH resource set # i. For example, PUCCH resource set #1 may be composed of resources of PUCCH formats 0 to 1, and the other PUCCH resource sets may be composed of resources of PUCCH formats 2 to 4 (see Table 5).

Then, the eNB may transmit DCI to the UE on the PDCCH and may indicate, through an ACK/NACK Resource Indicator (ARI) in the DCI, a PUCCH resource to be utilized for UCI transmission in a specific PUCCH resource set. The ARI may be used to indicate a PUCCH resource for ACK/NACK transmission and may be referred to as a PUCCH Resource Indicator (PRI). Here, the DCI may be DCI used for PDSCH scheduling, and the UCI may include HARQ-ACK for the PDSCH. For simplicity, the method of explicitly indicating a specific PUCCH resource in the PUCCH resource set using the ARI is referred to as a one-step PUCCH Resource Allocation (RA) scheme.

In addition, the eNB may configure a PUCCH resource set including PUCCH resources the number of which is larger than the number of states representable by the ARI for the UE, using a (UE-specific) higher layer (e.g., RRC) signal. In this case, the ARI may indicate a PUCCH resource subset in the PUCCH resource set, and a PUCCH resource to be used in the indicated PUCCH resource subset may be determined according to an implicit rule which is based on transmission resource information about the PDSCH and/or the PDCCH (e.g., a starting PRB index of the PDSCH, a starting CCE index of the PDCCH, and the like). For simplicity, the method of indicating a PUCCH resource subset with the ARI and determining a specific PUCCH resource in the indicated PUCCH resource subset according to an implicit rule is referred to as a two-step PUCCH RA scheme.

Hereinafter, a method for more efficiently allocating PUCCH resources using DL control information (e.g., DCI) and an implicit rule will be described.

In the present invention, a PUCCH resource may refer to a physical resource configured with, for example, at least one of the followings: a (OFDM) symbol position at which PUCCH transmission starts, a time duration or the number of symbols for which PUCCH transmission continues, frequency domain resource allocation information (e.g., a starting position of a PRB allocation resource and the number of allocated PRBs), information about whether frequency hopping is used, a cyclic shift (CS) index, and/or an orthogonal cover code (OCC) index/length.

For example, the PUCCH resources may be classified according to the PUCCH formats as follows.

TABLE 6

| | | PUCCH format 0 | PUCCH format 1 | PUCCH format 2 | PUCCH format 3 | PUCCH format 4 |
|---|---|---|---|---|---|---|
| Frequency resource of 2nd hop if frequency hopping is enabled | Value range | 0~274 | 0~274 | 0~274 | 0~274 | 0~274 |
| Index of initial cyclic shift | Configurability | O | O | X | X | X |
| | Value range | 0~11 | 0~11 | — | — | — |
| Index of time-domain OCC | Configurability | X | O | X | X | X |
| | Value range | — | 0~6 | — | — | — |
| Length of Pre-DFT OCC | Configurability | X | X | X | X | O |
| | Value range | — | — | — | — | 2, 4 |
| Index of Pre-DFT OCC | Configurability | X | X | X | X | O |
| | Value range | — | — | — | — | 0~3 |

In addition, the following terms are used in the present invention.

PUCCH resource superset: A set in which element(s) corresponds to a PUCCH resource set. For example, the PUCCH resource superset may be {PUCCH resource set #0, PUCCH resource set #1, . . . , PUCCH resource set #(K−1)}.

PUCCH resource subset: A subset of a PUCCH resource set. For example, the PUCCH resource set may be {PUCCH resource subset #0, PUCCH resource subset #1, . . . , PUCCH resource subset #(L−1)}. A PUCCH resource subset may consist of one or more, preferably a plurality of, PUCCH resources.

(PDSCH scheduling) DCI: DCI for scheduling a PDSCH (see FIG. 7). For example, the DCI includes DCI format 1_0 and DCI format 1_1. The DCI is transmitted on the PDCCH.

Fallback DCI format: A DCI format (e.g., DCI format 1_0) in which the DCI size/field configuration remains the same regardless of the UE configuration.

Non-fallback DCI format: A DCI format (e.g., DCI format 1_1) in which the DCI size/field configuration varies according to the UE configuration.

Counter downlink assignment index (c-DAI): A specific index value in DCI (e.g., DL scheduling DCI) that indicates an order of (scheduled) PDSCHs (or TBs or code block groups (CBGs)). In configuring a HARQ-ACK payload, the HARQ-ACK input bits may be configured in the c-DAI order.

Total DAI (t-DAI): A specific index value in DCI (e.g., DL scheduling DCI) that indicates the total number of PDSCHs (or TBs or CBGs) subjected to HARQ-ACK reporting. The UE may determine the size of the HARQ-ACK payload based on the t-DAI.

For simplicity, proposed schemes are separately described, but each proposed scheme may be combined with other proposed schemes of the present invention unless they do not contradict each other.

[Proposed Scheme #1]

If it is the time immediately after the UE has performed initial access or the time before the UE receives a (UE-specific) PUCCH resource set configuration through a (UE-specific) higher layer (e.g., RRC) signal, the UE cannot receive a UE-specific configuration of a PUCCH resource set, but may only receive a cell-common or UE-common configuration. In this case, when multiple UEs utilize the same PUCCH resource set, collision between PUCCH resources may become worse or fewer PUCCH resources may be available. For example, the eNB may configure a cell-commonly used PUCCH resource set through the RMSI (or SIB), which is a kind of system information, and the UE may perform the two-step PUCCH RA using the ARI and an implicit rule (that is based on the starting CCE index of the DL scheduling DCI and the like). In this case, to distinguish between the PUCCH resources for the UEs if possible, a PUCCH resource set that the eNB provides through the system information (e.g., RMSI, SIB) may be configured to be large (namely, the PUCCH resource set may include a large number of PUCCH resources). In this case, the PUCCH resource set includes more PUCCH resources than the number of states representable by the ARI, and the UE selects one of multiple PUCCH resource candidates by an implicit rule. Accordingly, the capability of controlling PUCCH resource allocation/scheduling for multiple UEs may be low in view of the eNB (or network).

In order to address the above-described issue, in transmitting HARQ-ACK for a PDSCH, the UE may determine a PUCCH resource according to the RNTI and the type of the PDSCH and/or PDCCH. Accordingly, even before a (UE-specific) higher layer signal is received, the PUCCH resource sets may be identified for each UE. The PUCCH resource may be determined as follows.

(1) Step 1: The eNB may configure a plurality of PUCCH resource sets (or a PUCCH resource superset) for the UE through the system information. The system information may be an RMSI (or SIB) and/or other system information (OSI).

(2) Step 2: A specific PUCCH resource set may be selected from among the plurality of PUCCH resource sets (or the PUCCH resource superset) using one of the following methods.

A. Opt. 1: The UE may select a specific PUCCH resource set from among the plurality of PUCCH resource sets (or the PUCCH resource superset) according to the type of the received PDSCH and/or PDCCH. For example, the type of the PDSCH and PDCCH may be classified according to the following criteria:

1. Whether or not the PDSCH is Msg4;
2. Whether the PDCCH is fallback DCI or non-fallback DCI; and
3. The DCI format of the PDCCH.

B. Opt. 2: The UE may select a specific PUCCH resource set from among the plurality of PUCCH resource sets (or the PUCCH resource superset) based on the RNTI and/or the DCI for scheduling Msg2.

1. The RNTI may be an RNTI received in the RACH procedure (e.g., RA-RNTI, TC-RNTI).
2. Bit fields (e.g., a PUCCH resource indicator (e.g., ARI), a PUCCH transmission timing indicator, etc.) related to PUCCH resource allocation/transmission in the DCI for scheduling Msg2 may be used in the operation of selecting the specific PUCCH resource set from among the plurality of PUCCH resource sets (or the PUCCH resource superset).

(3) Step 3: A specific PUCCH resource subset in the PUCCH resource set may be indicated by (PDSCH scheduling) DCI. As an example, the PUCCH resource subset in the PUCCH resource set may be indicated by the ARI in the (PDSCH scheduling) DCI.

(4) Step 4: A specific PUCCH resource may be selected in the PUCCH resource subset according to a (PDSCH or PDCCH transmission resource information-based) implicit rule. As an example, the implicit rule may be a scheme of selecting the specific PUCCH resource in the PUCCH resource subset based on one or more of the following parameters:

1. a (starting) CCE index on which a (PDSCH scheduling) PDCCH is transmitted;
2. a PDCCH candidate index on which the (PDSCH scheduling) PDCCH is transmitted;
3. a DL control region index in which the (PDSCH scheduling) PDCCH is transmitted;
4. a (starting) PRB index of a PDSCH region indicated by the (PDSCH scheduling) PDCCH;
5. HARQ-ACK timing indicated by the (PDSCH scheduling) PDCCH;
6. a UL BWP index (e.g., a BWP index for PUCCH transmission) indicated by the (PDSCH scheduling) PDCCH;
7. a slot index in which the (PDSCH scheduling) PDCCH is transmitted;
8. a slot index in which the PDSCH is transmitted; and
9. a slot index in which the PUCCH is transmitted.

Here, if only one PUCCH resource is left in a specific step, the PUCCH resource may be selected, and the subsequent steps may be skipped.

Figure 8:
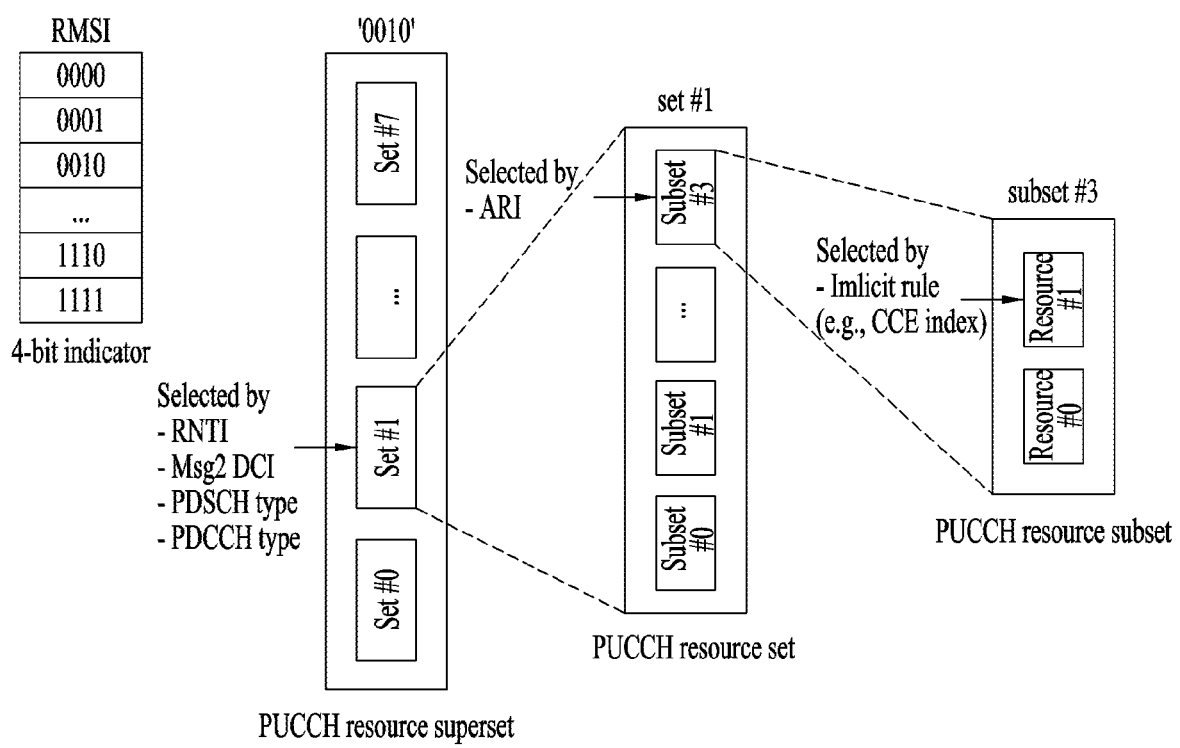
FIGS. 8 to 13 illustrate a PUCCH resource allocation procedure according to the present invention.

FIG. 8 illustrates a PUCCH resource allocation procedure according to the this scheme. In this scheme, the PUCCH resource is selected in three steps (i.e., three-step PUCCH RA).

Referring to FIG. 8, the 4-bit information in the RMSI represents 16 code points, and each of the code points may indicate one of (a maximum of) 16 PUCCH resource supersets. For example, '0010' may indicate PUCCH resource superset #1. Each PUCCH resource superset may be composed of (up to) 8 PUCCH resource sets.

Thereafter, one PUCCH resource set may be selected from among the eight PUCCH resource sets in the PUCCH resource superset based on the PDSCH and/or PDCCH type or the RNTI and/or Msg2 scheduling DCI according to the operation of Step 2. The eNB may indicate one specific PUCCH resource subset in each PUCCH resource set through the (PDSCH scheduling) DCI. When there are two or more PUCCH resources in the PUCCH resource subset, one PUCCH resource may be selected according to a (PDSCH and/or PDCCH transmission resource information-based) implicit rule. Specifically, the following methods may be considered.

In one example, the eNB may configure two PUCCH resource sets (e.g., Set A and Set B) in the PUCCH resource superset through the RMSI. The UE may select Set A if the PDSCH corresponding to the HARQ-ACK is scheduled by fallback DCI (e.g., DCI format 1_0) and select Set B if the PDSCH is scheduled by non-fallback DCI (e.g., DCI format 1_1). Then, the UE may select a PUCCH resource subset in the selected PUCCH resource set using the ARI in the DCI. If there are two or more elements in the selected PUCCH resource subset, the UE may determine one PUCCH resource according to a (PDSCH or PDCCH transmission resource information-based) implicit rule. Accordingly, the HARQ-ACK transmission PUCCH resource sets for UEs having a PDSCH scheduled by fallback DCI may be distinguished from those for UEs having a PDSCH scheduled by non-fallback DCI.

In another example, the eNB may configure N PUCCH resource sets in the PUCCH resource superset through the RMSI. The UE select one PUCCH resource set from among the N PUCCH resource sets based on the RNTI (or temporary UE ID (e.g., TC-RNTI)) received in the RACH procedure and/or the Msg2 scheduling DCI. As an example, indexing of the N PUCCH resources sets configured through the RMSI may be predefined, and a PUCCH resource set corresponding to an index value derived by applying Modulo N to the RNTI value may be selected. As another example, the UE does not perform PUCCH transmission for the PDSCH corresponding to Msg2. However, in order to maintain consistency of a DCI format in the DCI for scheduling Msg2, there may still be bit fields for indicating PUCCH resource allocation and a PUSCH transmission time as in the case of DCI for scheduling a normal PDSCH. In this case, the bit fields for indicating the PUCCH resource allocation and the PUSCH transmission time in the DCI for scheduling Msg2 may be re-interpreted as being used to indicate one of the N PUCCH resource sets in the PUCCH resource superset indicated by the RMSI. The UE may then select one PUCCH resource subset in the selected PUCCH resource set through the ARI. If there are two or more elements in the selected PUCCH resource subset, the UE may determine one PUCCH resource according to a (PDSCH or PDCCH transmission resource information-based) implicit rule. Accordingly, UEs to perform PUCCH transmission may be divided into N groups based on the RNTI or the Msg2 DCI, and PUCCH resource sets (physically) distinguished from each other may be allocated to the N groups, respectively.

Thereafter, the UEs may transmit UCI to the eNB using the selected PUCCH resource. The UCI may include HARQ-ACK.

[Proposed Scheme #2]

As described above, the eNB may configure a plurality of PUCCH resource sets for the UE, and the UE may select a specific PUCCH resource set corresponding to a specific range according to the range of the UCI payload size. Then, the eNB may transmit DCI to the UE on the PDCCH and may indicate, through the ARI in the DCI, a PUCCH resource to be used for UCI transmission in the specific PUCCH resource set. Here, the DCI may be DCI used for PDSCH scheduling, and the UCI may include HARQ-ACK for the PDSCH. In this case, if the PUCCH resource set is composed of more PUCCH resources than the number of states representable by the ARI, the ARI may indicate a PUCCH resource subset in the PUCCH resource set, and a PUCCH resource to be used in the indicated PUCCH resource subset may be determined according to an implicit rule which is based on transmission resource information about the PDSCH and/or the PDCCH (e.g., a starting PRB index, a starting CCE index, and the like). For simplicity, the two-step PUCCH RA will be referred to as Method A and the one-step PUCCH RA will be referred to as Method B in the following description.

When HARQ-ACKs for a plurality of PDSCHs are to be UCI-multiplexed and transmitted on a single PUCCH resource, the eNB should schedule each of the plurality of PDSCHs, and allocate the same PUCCH resource for the corresponding HARQ-ACK transmissions. When Method A is applied, the eNB should not only configure the same ARI value for the plurality of PDSCHs, but also limit the parameters applied to the implicit rule so as to indicate the same PUCCH resource. In this case, when the implicit rule has the PDCCH or PDCCH transmission resource information (e.g., the starting PRB index of the PDSCH, the starting CCE index of the PDCCH, and the like) as an input parameter, scheduling of the PDSCH or the PDCCH may be restricted in order to indicate the same PUCCH resource. As one method to address this issue, the PUCCH RAs of both Method A and Method B may be allowed only for a PUCCH resource set (e.g., a PUCCH resource set for UCI transmission of 2 or fewer bits) that is not expected to UCI-multiplex the HARQ-ACKs for the plurality of PDSCHs. For the other PUCCH resource sets (e.g., a PUCCH resource set for UCI transmission of more than 2 bits), only the PUCCH RA of Method B may be allowed.

That is, the PUCCH RAs of Method A and/or Method B may be supported for a PUCCH resource set for transmission of UCI (e.g., HARQ-ACK) smaller than or equal to X bits (e.g., X=2), and only the PUCCH RA of Method B may be applied to a PUCCH resource set for transmission of UCI (e.g., HARQ-ACK) larger than X bits. Here, the PUCCH resource set supporting transmission of UCI smaller than or equal to X bits (e.g., X=2) may be understood as a PUCCH resource set in which only HARQ-ACK bits corresponding to a single PDSCH can be transmitted. For example, the PUCCH resource set in which only HARQ-ACK bits corresponding to a single PDSCH can be transmitted may include a PUCCH resource set including a PUCCH format 0 resource and/or a PUCCH format 1 resource.

Figure 9:
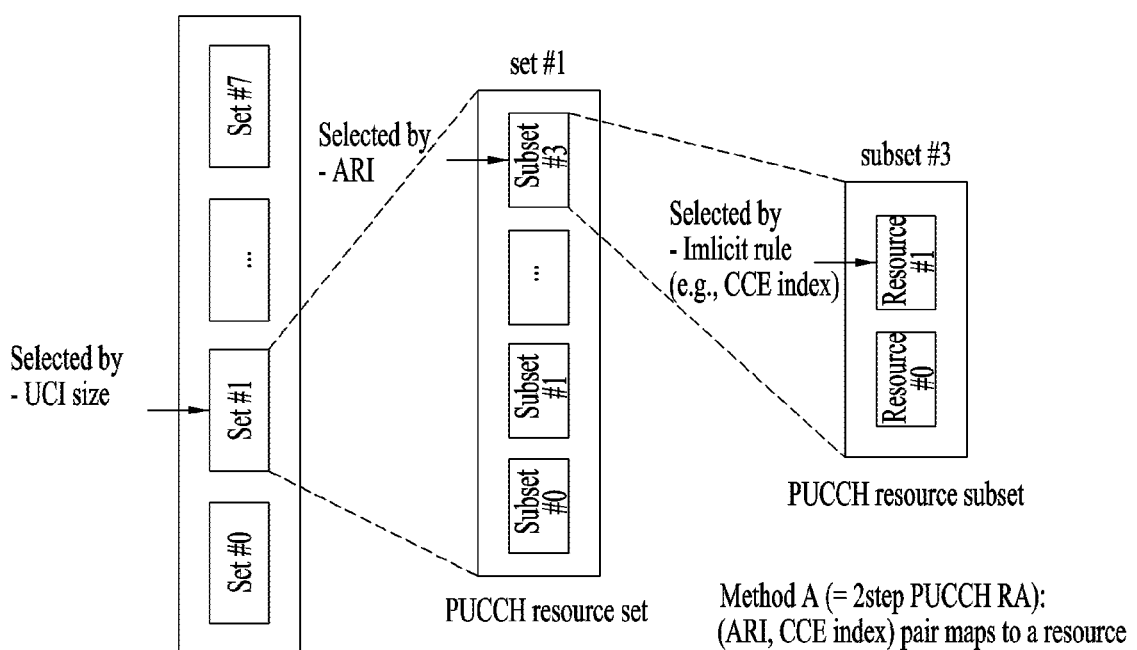

(1) Method A (=two-step PUCCH RA): A (single) PUCCH resource subset in the PUCCH resource set may be indicated by (PDSCH scheduling) DCI, and a (single) PUCCH resource may be selected in the PUCCH resource subset according to a (PDSCH or PDCCH transmission resource information-based) implicit rule. Here, the PDSCH transmission resource information may include a starting PRB index of the PDSCH, and the PDCCH transmission resource information may include a starting CCE index of the PDCCH. FIG. 9 illustrates PUCCH resource allocation according to Method A. In Method A, a pair of (ARI, PDSCH or PDCCH transmission resource information) may be mapped to a single PUCCH for UCI transmission (one-to-one mapping). For example, a pair of (ARI, CCE index) may be mapped to a single PUCCH for UCI transmission.

Figure 10:
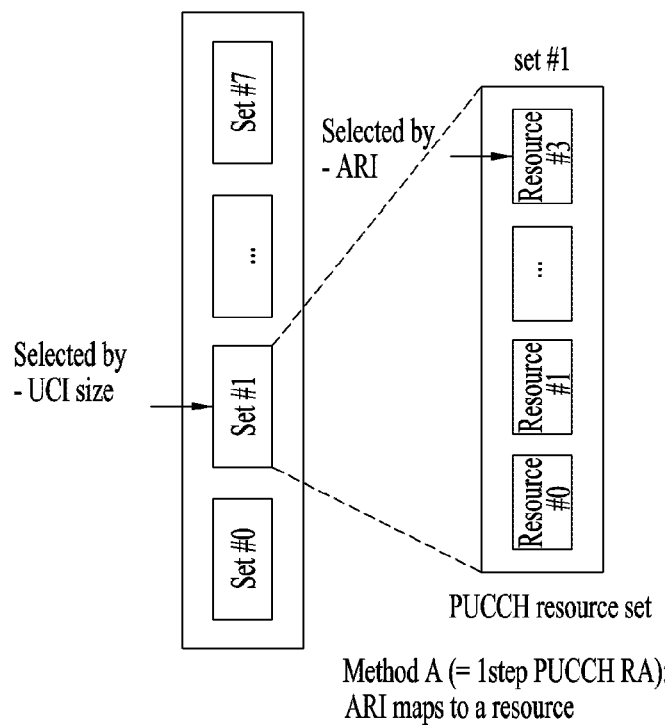

(2) Method B (=one-step PUCCH RA): A (single) PUCCH resource in the PUCCH resource set may be indicated by (PDSCH scheduling) DCI. FIG. 10 illustrates PUCCH resource allocation according to Method B. In Method B, the ARI may be mapped to a single PUCCH for UCI transmission (one-to-one mapping).

Figure 11:
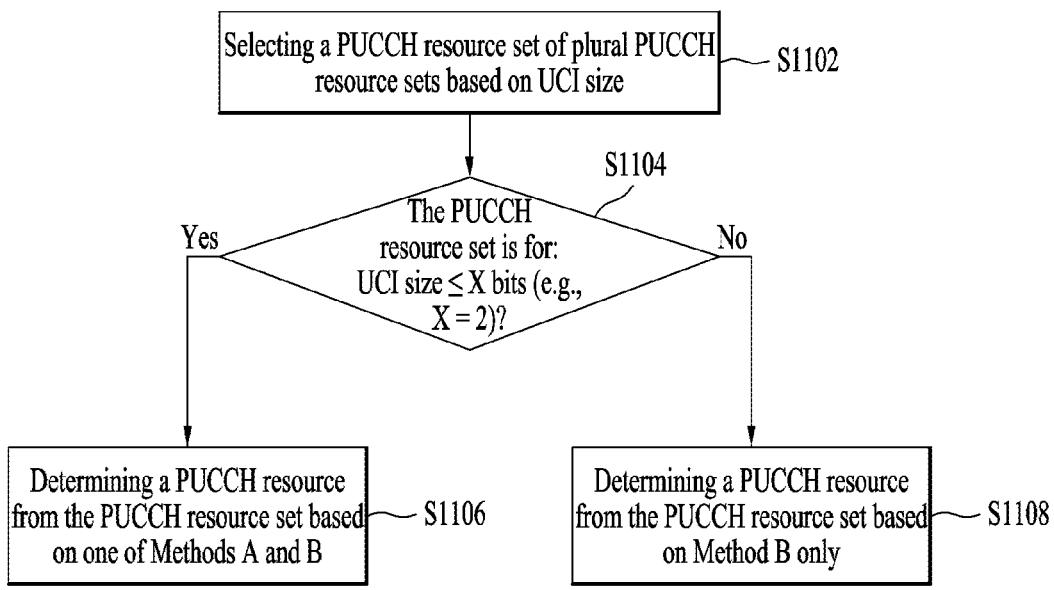
Figure 12:
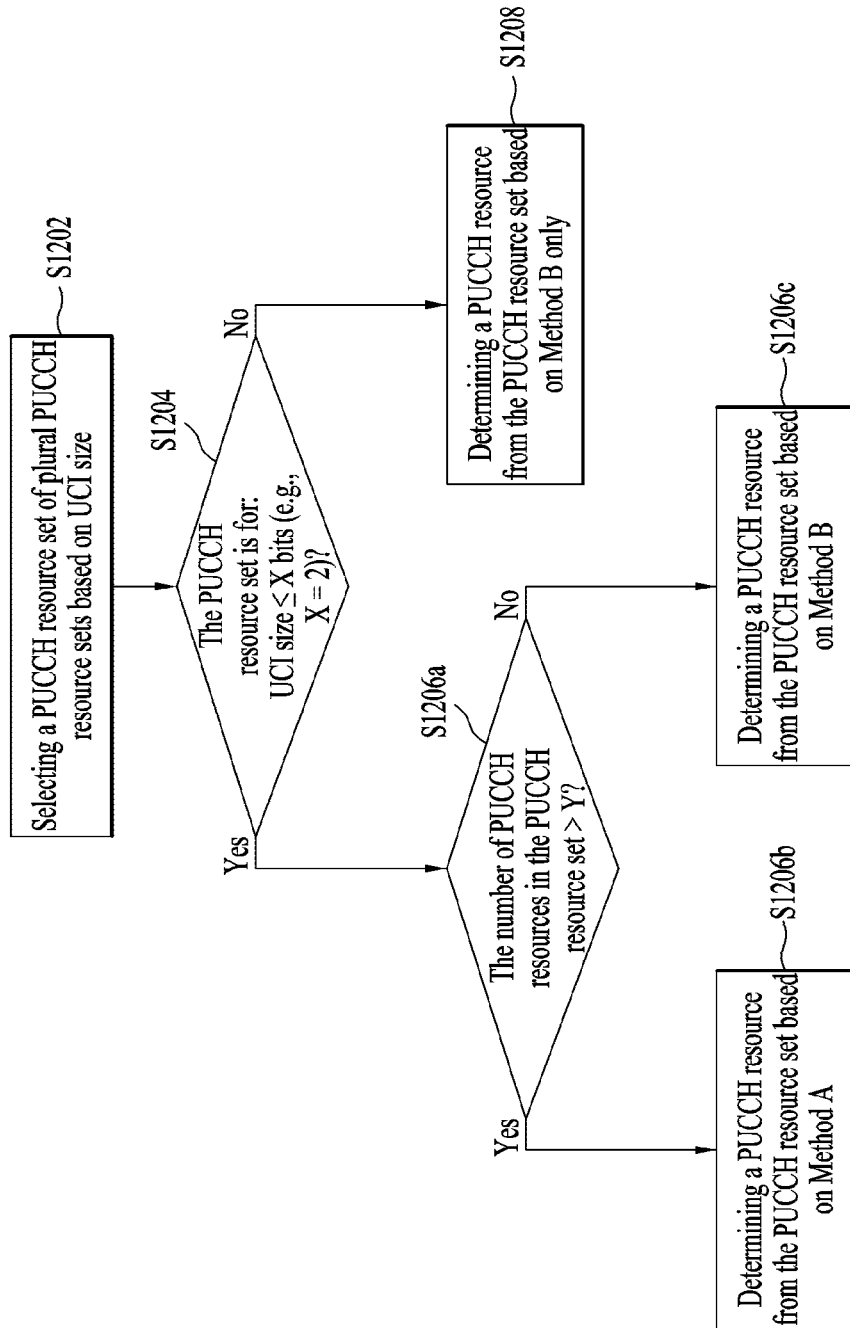
Figure 13:
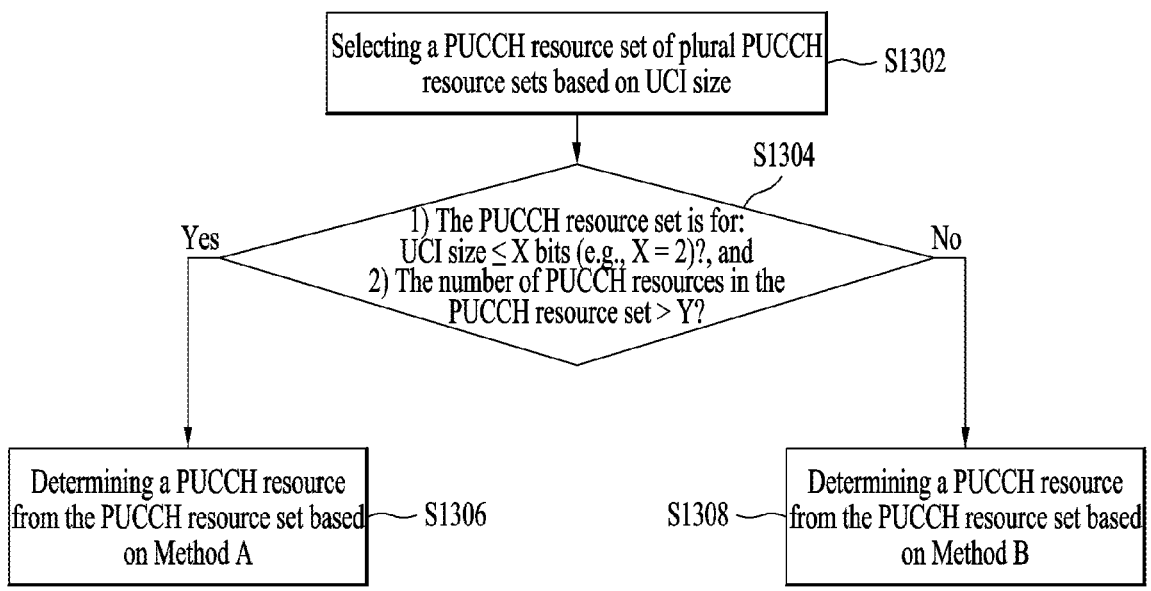

FIGS. 11 to 13 illustrate a PUCCH resource allocation procedure according to the present invention. Here, the PUCCH resources may include a PUCCH resource for HARQ-ACK transmission. For example, the procedures of FIGS. 11 to 13 may be part of the resource allocation procedure for PUCCH transmission of FIG. 7.

Referring to FIG. 11, the UE may select a PUCCH resource set from among a plurality of PUCCH resource sets based on the UCI size (S1102). The plurality of PUCCH resource sets may be configured by a higher layer (e.g., RRC) signal as follows.

PUCCH resource set #0, if Number of UCI bits≤2;
PUCCH resource set #1, if 2<Number of UCI bits≤$N_1$;
. . . ;
PUCCH resource set #(K−1), if $N_{K-2}$<Number of UCI bits≤$N_{K-1}$.

Here, K denotes the number of PUCCH resource sets (K>1), and $N_i$ is the maximum number of UCI bits supported by PUCCH resource set # i.

Thereafter, the UE may check whether the selected PUCCH resource set is for "Number of UCI bits≤X (e.g., 2) bits" (S1104). If the selected PUCCH resource set is for "Number of UCI bits≤X (e.g., 2) bits," the UE may determine a PUCCH resource for UCI transmission in the selected PUCCH resource set based on either Method A or Method B. The UCI includes HARQ-ACK (S1106). On the other hand, if the selected PUCCH resource set is not for "Number of UCI bits≤X (e.g., 2) bits" (i.e., "Number of UCI bits>X"), the UE may determine a PUCCH resource for UCI transmission in the selected PUCCH resource set based on Method B only (S1108).

FIG. 12 is basically the same as FIG. 11. The difference from FIG. 11 is that S1106 in FIG. 11 is subdivided into S1206a, S1206b, and S1206c in FIG. 12. Thus, only S1206a, S1206b, and S1206c will be described. If the PUCCH resource set is for "Number of UCI bits≤X (e.g., 2) bits" as a result of operation S1204, the UE may check whether the number of PUCCH resources in the PUCCH resource set is greater than Y (S1206a). Here, Y may have the same value as the number of states representable by the ARI (for example, Y=4 when the ARI has 2 bits and Y=8 when the ARI has 3 bits). As a result, if the number of PUCCH resources in the PUCCH resource set is greater than Y, the UE may determine a PUCCH resource for UCI transmission in the PUCCH resource set based on Method A (S1206b). On the other hand, if the number of PUCCH resources in the PUCCH resource set is less than or equal to Y, the UE may determine a PUCCH resource for UCI transmission in the PUCCH resource set based on Method B (S1206c).

FIG. 13 is basically the same as FIG. 12. The difference from FIG. 12 is that S1204 and S1206a in FIG. 12 are combined into S1304, and S1206c and S1208 in FIG. 12 are combined into S1308. Thus, if 1) the PUCCH resource set is for "Number of UCI bits≤X (e.g., 2) bits" and 2) the number of PUCCH resources in the PUCCH resource set is greater than Y, the UE may determine a PUCCH resource for UCI transmission in the PUCCH resource set based on Method A (S 1306). On the other hand, if any of 1) and 2) is not satisfied, the UE may determine a PUCCH resource for UCI transmission in the PUCCH resource set based on Method B (S1308).

[Proposed Scheme #3]

In the NR system, the system bandwidth in a carrier is very large, and thus the system bandwidth may not be fully utilized depending on the RF characteristics of the UE. Therefore, the entire system bandwidth may be divided into a plurality of BWPs. Each BWP may include a bandwidth and a position of a frequency-domain resource and may also include OFDM numerology information to be applied to the frequency resource. In this case, if the eNB indicates a HARQ-ACK transmission PUCCH resource corresponding to PDSCH transmission through the (PDSCH scheduling) DCI, the UL BWP that is valid at the reception time of the PDSCH may differ from the UL BWP that is valid at the transmission time of the HARQ-ACK PUCCH. In order to support the above-described operation, the eNB needs to signal, to the UE, information about a BWP at which a PUCCH resource is transmitted.

To address the above-described issue, the eNB may signal, to the UE, BWP information about a specific PUCCH resource using one or more of the following methods.

(1) BWP information may be configured for each PUCCH resource.

(2) The BWP at which a PUCCH resource is to be transmitted may be indicated through DCI. Here, the DCI may be (PDSCH scheduling) DCI or group-common DCI.

[Proposed Scheme #4]

In the NR system, the c-DAI may be utilized to determine the HARQ-ACK payload when the UE transmits HARQ-ACK information corresponding to a plurality of PDSCHs on a single PUCCH resource. If it is time before RRC connection setup after the initial access, the UE may not perform the operation of transmitting HARQ-ACKs for the plurality of PDSCHs on a single PUCCH resource. In particular, on a PUCCH resource utilized before RRC connection setup, only transmission of HARQ-ACK bits corresponding to a single PDSCH may be allowed. However, if there is a bit field (hereinafter, Field A) for the c-DAI in the (DL scheduling) DCI performing the fallback operation, Field A may always be present in the DCI to maintain a constant DCI size. Here, before the RRC connection setup, Field A may not be used for the DAI, and thus may be used for another purpose. Accordingly, in the present invention, when there is a bit field (hereinafter, Field B) for indicating a PUCCH resource in the (DL scheduling) DCI, the bit width of the bit filed may be extended by adding Field A to Field B before the RRC connection setup. After the RRC connection setup, Field A and Field B may be used for c-DAI and PUCCH resource indication, respectively. Alternatively, the c-DAI may be used for other purposes if a (UE-specific) PUCCH resource set (of K or more bits) supporting HARQ-ACK transmission for a plurality of PDSCHs has not been configured for the UE. Therefore, before the (UE-specific) PUCCH resource set (of K or more bits) is configured for the UE, Field A may be added to Field B to extend the bit width of the bit field for PUCCH resource indication. After the (UE-specific) PUCCH resource set (of K or more bits) is configured for the UE, Field A and Field B may be used for the c-DAI and the PUCCH resource indication, respectively.

That is, when an X1-bit field (hereinafter, Field A) and an X2 bit field (hereinafter, Field B) are included in the (DL scheduling) DCI, Fields A and B may be used differently according to the following specific conditions. Accordingly, even before a (UE-specific) higher layer signal is received, the PUCCH resource sets for the respective UEs may be distinguished from each other.

(1) Opt. 1: the fields are used differently depending on whether or not the RRC connection setup is made, A. Before the RRC connection setup: Field A+Field B may be used for indication of a PUCCH resource (in the PUCCH resource set).

B. After the RRC connection setup: Field A may be used for DAI (e.g. c-DAI) and Field B may be used for indication of a PUCCH resource (in the PUCCH resource set).

(2) Opt. 2: the fields are used differently depending on whether a (UE-specific) PUCCH resource set (of K or more bits) is configured.

A. Before a (UE-specific) PUCCH resource set is configured (when the set is configured): Field A+Field B may be used for indication of a PUCCH resource (in the PUCCH resource set).

B. After a (UE-specific) PUCCH resource set is configured (when the set is not configured): Field A may be used for DAI (e.g. c-DAI) and Field B may be used for indication of a PUCCH resource (in the PUCCH resource set).

In the above-described scheme, the number of resources in the PUCCH resource set before the RRC connection setup (or before configuration of the (UE-specific) PUCCH resource set) may be set to be larger than the number of resources in the PUCCH resource set after the RRC connection setup (or after configuration of the (UE-specific) PUCCH resource set), in proportion to the number of bits of Field A or the number of states represented by the field.

Figure 14:
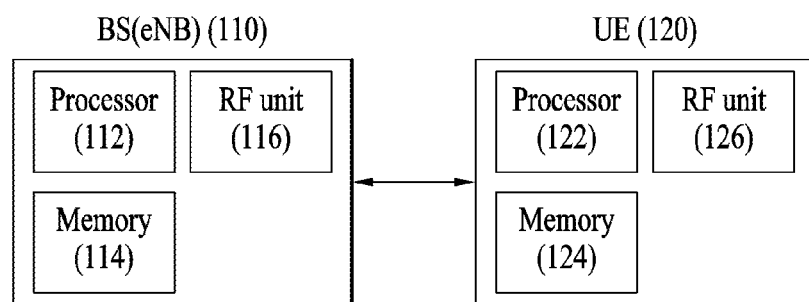
FIG. 14 illustrates a base station and a user equipment applicable to an embodiment of the present invention.

FIG. 14 illustrates a BS and a UE of a wireless communication system, which are applicable to embodiments of the present invention.

Referring to FIG. 14, the wireless communication system includes a BS 110 and a UE 120. When the wireless communication system includes a relay, the BS or UE may be replaced by the relay.

The BS 110 includes a processor 112, a memory 114 and a radio frequency (RF) unit 116. The processor 112 may be configured to implement the procedures and/or methods proposed by the present invention. The memory 114 is connected to the processor 112 and stores information related to operations of the processor 112. The RF unit 116 is connected to the processor 112 and transmits and/or receives an RF signal. The UE 120 includes a processor 122, a memory 124 and an RF unit 126. The processor 122 may be configured to implement the procedures and/or methods proposed by the present invention. The memory 124 is connected to the processor 122 and stores information related to operations of the processor 122. The RF unit 126 is connected to the processor 122 and transmits and/or receives an RF signal.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It will be obvious to those skilled in the art that claims that are not explicitly cited in each other in the appended claims may be presented in combination as an embodiment of the present invention or included as a new claim by a subsequent amendment after the application is filed.

In the embodiments of the present invention, a description is made centering on a data transmission and reception relationship among a BS, a relay, and an MS. In some cases, a specific operation described as performed by the BS may be performed by an upper node of the BS. Namely, it is apparent that, in a network comprised of a plurality of network nodes including a BS, various operations performed for communication with an MS may be performed by the BS, or network nodes other than the BS. The term 'BS' may be replaced with the term 'fixed station', 'Node B', 'enhanced Node B (eNode B or eNB)', 'access point', etc. The term 'UE' may be replaced with the term 'Mobile Station (MS)', 'Mobile Subscriber Station (MSS)', 'mobile terminal', etc.

The embodiments of the present invention may be achieved by various means, for example, hardware, firmware, software, or a combination thereof. In a hardware configuration, the methods according to the embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the embodiments of the present invention may be implemented in the form of a module, a procedure, a function, etc. For example, software code may be stored in a memory unit and executed by a processor. The memory unit is located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

The present invention is applicable to UEs, eNBs or other apparatuses of a wireless mobile communication system.

The invention claimed is:

1. A method for performing uplink transmission by a communication device in a wireless communication system, the method comprising:
receiving downlink control information (DCI) for downlink scheduling, the DCI comprising resource indication information (RI);
receiving downlink data indicated by the DCI; and
transmitting uplink control information (UCI) including hybrid automatic repeat request acknowledgement (HARQ-ACK) information for the downlink data using a PUCCH resource corresponding to the RI in a physical uplink control channel (PUCCH) resource set, wherein the PUCCH resource set is selected from a plurality of PUCCH resource sets based on a size of the UCI,
wherein, based on a UCI size supported by the PUCCH resource set being less than or equal to X (>=1) bits, the PUCCH resource is determined using one of a first scheme and a second scheme, and
wherein, based on the UCI size supported by the PUCCH resource set being greater than X bits, the PUCCH resource is determined using only the second scheme:
the first scheme: the PUCCH resource in the PUCCH resource set is determined based on both the RI and an index of a resource used for reception of the DCI; and
the second scheme: the PUCCH resource in the PUCCH resource set is determined based on the RI only.

2. The method according to claim 1, wherein X is 2.

3. The method according to claim 2, wherein, when the UCI size supported by the PUCCH resource set is less than or equal to X (>=1) bits, the first scheme or the second scheme is used based on the number of PUCCH resources in the PUCCH resource set.

4. The method according to claim 3, wherein, when the UCI size supported by the PUCCH resource set is less than or equal to X (>=1) bits and the number of PUCCH resources in the PUCCH resource set is greater than a reference value, the PUCCH resource is determined using the first scheme,
wherein the reference value is equal to the number of values representable by the RI.

5. The method according to claim 3, wherein, when the UCI size supported by the PUCCH resource set is less than or equal to X (>=1) bits and the number of PUCCH resources in the first PUCCH resource set is less than or equal to a reference value, the PUCCH resource is determined using the second scheme,
wherein the reference value is equal to the number of values representable by the RI.

6. The method according to claim 1, wherein X is 2.

7. A communication apparatus for use in a wireless communication system, comprising:
a memory; and
a processor, the processor being configured to:
receive downlink control information (DCI) for downlink scheduling information, the DCI comprising resource indication information (RI);
receive downlink data indicated by the DCI; and
transmit uplink control information (UCI) including hybrid automatic repeat request acknowledgement (HARQ-ACK) information for the downlink data using a physical uplink control channel (PUCCH) resource corresponding to the RI in a PUCCH resource set, wherein the PUCCH resource set is selected from a plurality of PUCCH resource sets based on a size of the UCI,
wherein, based on a UCI size supported by the PUCCH resource set being less than or equal to X (>=1) bits, the PUCCH resource is determined using one of a first scheme and a second scheme, and
wherein, based on the UCI size supported by the PUCCH resource set being greater than X bits, the PUCCH resource is determined using only the second scheme:
the first scheme: the PUCCH resource in the PUCCH resource set is determined based on both the RI and an index of a resource used for reception of the DCI; and
the second scheme: the PUCCH resource in the PUCCH resource set is determined based on the RI only.

8. The communication apparatus according to claim 7, wherein X is 2.

9. The communication apparatus according to claim 8, wherein, when the UCI size supported by the PUCCH resource set is less than or equal to X (>=1) bits, the first scheme or the second scheme is used based on the number of PUCCH resources in the PUCCH resource set.

10. The communication apparatus according to claim 9, wherein, when the UCI size supported by the PUCCH resource set is less than or equal to X (>=1) bits and the number of PUCCH resources in the PUCCH resource set is greater than a reference value, the PUCCH resource is determined using the first scheme,
wherein the reference value is equal to the number of values representable by the RI.

11. The communication apparatus according to claim 9, wherein, when the UCI size supported by the PUCCH resource set is less than or equal to X (>=1) bits and the number of PUCCH resources in the PUCCH resource set is less than or equal to a reference value, the PUCCH resource is determined using the second scheme,
wherein the reference value is equal to the number of values representable by the RI.

12. The communication apparatus according to claim 9, wherein based on the size of the UCI being less than or equal to X (>=1) bits, and based on the number of the PUCCH resources in the PUCCH resource set being greater than a reference value, the PUCCH resource is determined according to the first scheme, wherein the reference value is equal to a number of values representable by the PUCCH resource indicator.

13. A method for receiving control information by a communication apparatus in a wireless communication system, the method comprising:

transmitting downlink control information (DCI) for downlink scheduling, the DCI comprising resource indication information (RI);

transmitting downlink data indicated by the DCI; and receiving uplink control information (UCI) including hybrid automatic repeat request acknowledgement (HARQ-ACK) information for the downlink data using a physical uplink control channel (PUCCH) resource corresponding to the RI in a PUCCH resource set, wherein the PUCCH resource set is selected from a plurality of PUCCH resource sets based on a size of the UCI, wherein, based on a UCI size supported by the PUCCH resource set being less than or equal to X (>=1) bits, the PUCCH resource is determined using one of a first scheme and a second scheme, and wherein, based on the UCI size supported by the PUCCH resource set being greater than X bits, the PUCCH resource is determined using only the second scheme:

the first scheme: the PUCCH resource in the PUCCH resource set is determined based on both the RI and an index of a resource used for reception of the DCI; and the second scheme: the PUCCH resource in the PUCCH resource set is determined based on the RI only.

14. The method according to claim 13, wherein X is 2.

15. The method according to claim 14, wherein, when the UCI size supported by the PUCCH resource set is less than or equal to X (>=1) bits, the first scheme or the second scheme is used based on the number of PUCCH resources in the PUCCH resource set.

16. The method according to claim 15, wherein, when the UCI size supported by the PUCCH resource set is less than or equal to X (>=1) bits and the number of PUCCH resources in the PUCCH resource set is greater than a reference value, the PUCCH resource is determined using the first scheme, wherein the reference value is equal to the number of values representable by the RI.

17. The method according to claim 15, wherein, when the UCI size supported by the PUCCH resource set is less than or equal to X (>=1) bits and the number of PUCCH resources in the PUCCH resource set is less than or equal to a reference value, the PUCCH resource is determined using the second scheme, wherein the reference value is equal to the number of values representable by the RI.

18. A communication apparatus for use in a wireless communication system, comprising:

a memory; and a processor, the processor being configured to:

transmit downlink control information (DCI) for downlink scheduling, the DCI comprising resource indication information (RI);

transmit downlink data indicated by the DCI; and receive uplink control information (UCI) including hybrid automatic repeat request acknowledgement (HARQ-ACK) information for the downlink data using a physical uplink control channel (PUCCH) resource corresponding to the RI in a PUCCH resource set, wherein the PUCCH resource set is selected from a plurality of PUCCH resource sets based on a size of the UCI, wherein, based on a UCI size supported by the PUCCH resource set being less than or equal to X (>=1) bits, the PUCCH resource is determined using one of a first scheme and a second scheme, and wherein, based on the UCI size supported by the PUCCH resource set being greater than X bits, the PUCCH resource is determined using only the second scheme:

the first scheme: the PUCCH resource in the PUCCH resource set is determined based on both the RI and an index of a resource used for reception of the DCI; and the second scheme: the PUCCH resource in the PUCCH resource set is determined based on the RI only.

19. The communication apparatus according to claim 18, wherein X is 2.

20. The communication apparatus according to claim 19, wherein, when the UCI size supported by the PUCCH resource set is less than or equal to X (>=1) bits, the first scheme or the second scheme is used based on the number of PUCCH resources in the PUCCH resource set.

21. The communication apparatus according to claim 20, wherein, when the UCI size supported by the PUCCH resource set is less than or equal to X (>=1) bits and the number of PUCCH resources in the PUCCH resource set is greater than a reference value, the PUCCH resource is determined using the first scheme, wherein the reference value is equal to the number of values representable by the RI.

22. The communication apparatus according to claim 20, wherein, when the UCI size supported by the PUCCH resource set is less than or equal to X (>=1) bits and the number of PUCCH resources in the PUCCH resource set is less than or equal to a reference value, the PUCCH resource is determined using the second scheme, wherein the reference value is equal to the number of values representable by the RI.

23. The communication apparatus according to claim 18, wherein X is 2.

24. A method performed by a user equipment (UE) operating in a wireless communication system, the method comprising:

receiving downlink control information (DCI) comprising (i) downlink scheduling information for receiving downlink data, and (ii) a physical uplink control channel (PUCCH) resource indicator for transmitting uplink control information (UCI), wherein the UCI includes hybrid automatic repeat request acknowledgement (HARQ-ACK) information for the downlink data;

receiving the downlink data based on the downlink scheduling information;

determining, based on a size of the UCI, a PUCCH resource set from among a plurality of PUCCH resource sets that are configured for the UE;

determining, from among PUCCH resources in the PUCCH resource set and based on the PUCCH resource indicator in the DCI, a PUCCH resource on which to transmit the UCI; and transmitting, on the PUCCH resource, the UCI including the HARQ-ACK information for the received downlink data, wherein determining the PUCCH resource from among the PUCCH resources in the PUCCH resource set comprises:

based on the size of the UCI being less than or equal to X (>=1) bits, determining the PUCCH resource according to one of a first scheme or a second scheme; and based on the size of the UCI being greater than X bits, determining the PUCCH resource according to only the second scheme, wherein according to the first scheme, the PUCCH resource in the PUCCH resource set is determined based on both (i) the PUCCH resource indicator that was included in the DCI, and (ii) an index of a downlink resource that was used for reception of the DCI, and wherein according to the second scheme, the PUCCH resource in the PUCCH resource set is determined based on the PUCCH resource indicator, but not based on the index of the downlink resource that was used for reception of the DCI.

25. The method according to claim 24, wherein based on the size of the UCI being less than or equal to X (>=1) bits, the first scheme or the second scheme is used based on a number of the PUCCH resources in the PUCCH resource set.

26. The method according to claim 25, wherein based on the size of the UCI being less than or equal to X (>=1) bits, and based on the number of the PUCCH resources in the PUCCH resource set being greater than a reference value, the PUCCH resource is determined according to the first scheme, wherein the reference value is equal to a number of values representable by the PUCCH resource indicator.

27. The method according to claim 25, wherein based on the size of the UCI being less than or equal to X (>=1) bits, and based on the number of the PUCCH resources in the first PUCCH resource set being less than or equal to a reference value, the PUCCH resource is determined according to the second scheme, wherein the reference value is equal to a number of values representable by the PUCCH resource indicator.

28. A communication apparatus configured to control a user equipment (UE) to operate in a wireless communication system, the communication apparatus comprising:

at least one processor; and at least one computer memory operably connectable to the at least one processor and storing instructions that, when executed by the at least one processor, perform operations comprising:

receiving downlink control information (DCI) comprising (i) downlink scheduling information for receiving downlink data, and (ii) a physical uplink control channel (PUCCH) resource indicator for transmitting uplink control information (UCI), wherein the UCI includes hybrid automatic repeat request acknowledgement (HARQ-ACK) information for the downlink data;

receiving the downlink data based on the downlink scheduling information;

determining, based on a size of the UCI, a PUCCH resource set from among a plurality of PUCCH resource sets that are configured for the UE;

determining, from among PUCCH resources in the PUCCH resource set and based on the PUCCH resource indicator in the DCI, a PUCCH resource on which to transmit the UCI; and transmitting, on the PUCCH resource, the UCI including the HARQ-ACK information for the received downlink data, wherein determining the PUCCH resource from among the PUCCH resources in the PUCCH resource set comprises:

based on the size of the UCI being less than or equal to X (>=1) bits, determining the PUCCH resource according to one of a first scheme or a second scheme; and based on the size of the UCI being greater than X bits, determining the PUCCH resource according to only the second scheme, wherein according to the first scheme, the PUCCH resource in the PUCCH resource set is determined based on both (i) the PUCCH resource indicator that was included in the DCI, and (ii) an index of a downlink resource that was used for reception of the DCI, and wherein according to the second scheme, the PUCCH resource in the PUCCH resource set is determined based on the PUCCH resource indicator, but not based on the index of the downlink resource that was used for reception of the DCI.

29. The communication apparatus according to claim 28, wherein X is 2.

30. The communication apparatus according to claim 28, wherein based on the size of the UCI being less than or equal to X (>=1) bits, the first scheme or the second scheme is used based on a number of the PUCCH resources in the PUCCH resource set.

31. The communication apparatus according to claim 30, wherein based on the size of the UCI being less than or equal to X (>=1) bits, and based on the number of the PUCCH resources in the first PUCCH resource set being less than or equal to a reference value, the PUCCH resource is determined according to the second scheme, wherein the reference value is equal to a number of values representable by the PUCCH resource indicator.

32. A method performed by a base station operating in a wireless communication system, the method comprising:

transmitting downlink control information (DCI) comprising (i) downlink scheduling information for transmitting downlink data, and (ii) a physical uplink control channel (PUCCH) resource indicator for receiving uplink control information (UCI);

transmitting the downlink data based on the downlink scheduling information; and receiving, on the PUCCH resource, the UCI including hybrid automatic repeat request acknowledgement (HARQ-ACK) information for the transmitted downlink data, wherein, based on a size of the UCI being less than or equal to X (>=1) bits, the PUCCH resource is determined according to one of a first scheme or a second scheme, and wherein, based on the size of the UCI being greater than X bits, the PUCCH resource is determined according to only the second scheme:
  wherein according to the first scheme, the PUCCH resource in the PUCCH resource set is determined based on both (i) the PUCCH resource indicator that was included in the DCI, and (ii) an index of a downlink resource that was used for reception of the DCI, and
  wherein according to the second scheme, the PUCCH resource in the PUCCH resource set is determined based on the PUCCH resource indicator, but not based on the index of the downlink resource that was used for transmission of the DCI.

33. The method according to claim 32, wherein X is 2.

34. The method according to claim 32, wherein based on the size of the UCI being less than or equal to X (>=1) bits, the first scheme or the second scheme is used based on a number of the PUCCH resources in the PUCCH resource set.

35. The method according to claim 34, wherein based on the size of the UCI being less than or equal to X (>=1) bits, and based on the number of the PUCCH resources in the PUCCH resource set being greater than a reference value, the PUCCH resource is determined according to the first scheme,
  wherein the reference value is equal to a number of values representable by the PUCCH resource indicator.

36. The method according to claim 34, wherein based on the size of the UCI being less than or equal to X (>=1) bits, and based on the number of the PUCCH resources in the first PUCCH resource set being less than or equal to a reference value, the PUCCH resource is determined according to the second scheme,
  wherein the reference value is equal to a number of values representable by the PUCCH resource indicator.

37. A communication apparatus configured to control a base station to operate in a wireless communication system, the communication apparatus comprising:
  at least one processor; and
  at least one computer memory operably connectable to the at least one processor and storing instructions that, when executed by the at least one processor, perform operations comprising:
  transmitting downlink control information (DCI) comprising (i) downlink scheduling information for transmitting downlink data, and (ii) a physical uplink control channel (PUCCH) resource indicator for receiving uplink control information (UCI);
  transmitting the downlink data based on the downlink scheduling information; and
  receiving, on the PUCCH resource, the UCI including hybrid automatic repeat request acknowledgement (HARQ-ACK) information for the transmitted downlink data,
  wherein, based on a size of the UCI being less than or equal to X (>=1) bits, the PUCCH resource is determined according to one of a first scheme or a second scheme, and
  wherein, based on the size of the UCI being greater than X bits, the PUCCH resource is determined according to only the second scheme:
  wherein according to the first scheme, the PUCCH resource in the PUCCH resource set is determined based on both (i) the PUCCH resource indicator that was included in the DCI, and (ii) an index of a downlink resource that was used for reception of the DCI, and
  wherein according to the second scheme, the PUCCH resource in the PUCCH resource set is determined based on the PUCCH resource indicator, but not based on the index of the downlink resource that was used for transmission of the DCI.

38. The communication apparatus according to claim 37, wherein based on the size of the UCI being less than or equal to X (>=1) bits, the first scheme or the second scheme is used based on a number of the PUCCH resources in the PUCCH resource set.

39. The communication apparatus according to claim 38, wherein based on the size of the UCI being less than or equal to X (>=1) bits, and based on the number of the PUCCH resources in the PUCCH resource set being greater than a reference value, the PUCCH resource is determined according to the first scheme,
  wherein the reference value is equal to a number of values representable by the PUCCH resource indicator.

40. The communication apparatus according to claim 38, wherein based on the size of the UCI being less than or equal to X (>=1) bits, and based on the number of the PUCCH resources in the first PUCCH resource set being less than or equal to a reference value, the PUCCH resource is determined according to the second scheme,
  wherein the reference value is equal to a number of values representable by the PUCCH resource indicator.

* * * * *